(12) United States Patent
Overdulve et al.

(10) Patent No.: US 10,316,152 B2
(45) Date of Patent: Jun. 11, 2019

(54) THERMOPLASTIC GEL COMPOSITIONS AND THEIR METHODS OF MAKING

(71) Applicants: COMMSCOPE CONNECTIVITY BELGIUM BVBA, Kessel-Lo (BE); COMMSCOPE TECHNOLOGIES LLC, Hickory, NC (US)

(72) Inventors: Bjorn Overdulve, Eindhoven (NL); Chris Radelet, Kessel-Lo (BE); Gary W. Adams, Holly Springs, NC (US); William B. Bryan, Fuquay-Varina, NC (US); Marie-Christine Dela Ruelle, Kessel-Lo (BE); Nathalie Jeanne Hendrickx, Kessel-Lo (BE)

(73) Assignees: Commscope Connectivity Belgium BVBA, Kessel-Lo (BE); Commscope Technologies LLC, Hickory, NC (US)

( * ) Notice: Subject to any disclaimer, the term of this patent is extended or adjusted under 35 U.S.C. 154(b) by 24 days.

(21) Appl. No.: 15/110,594

(22) PCT Filed: Jan. 9, 2015

(86) PCT No.: PCT/US2015/010778
§ 371 (c)(1),
(2) Date: Jul. 8, 2016

(87) PCT Pub. No.: WO2015/106075
PCT Pub. Date: Jul. 16, 2015

(65) Prior Publication Data
US 2016/0347914 A1    Dec. 1, 2016

Related U.S. Application Data

(60) Provisional application No. 61/925,707, filed on Jan. 10, 2014.

(51) Int. Cl.
*C08J 3/075*   (2006.01)
*C08K 3/013*   (2018.01)
(Continued)

(52) U.S. Cl.
CPC ............... *C08J 3/075* (2013.01); *C08K 3/01* (2018.01); *C08K 3/013* (2018.01); *C08L 53/00* (2013.01);
(Continued)

(58) Field of Classification Search
None
See application file for complete search history.

(56) References Cited

U.S. PATENT DOCUMENTS

| | | | | |
|---|---|---|---|---|
| 4,122,134 A | * | 10/1978 | Miki | C08F 297/04 525/272 |
| 4,167,545 A | * | 9/1979 | Fahrbach | C08G 81/022 525/122 |

(Continued)

FOREIGN PATENT DOCUMENTS

| | | |
|---|---|---|
| WO | 02/081562 | 10/2002 |
| WO | 2012/175526 A1 | 12/2012 |
| WO | 2013/160252 A2 | 10/2013 |

OTHER PUBLICATIONS

Shore Durometer Conversion Chart to Thermal Tech Equipment Co Inc. 2000-2018, pp. 1-3 (Year: 2000).*

(Continued)

*Primary Examiner* — Peter A Salamon
(74) *Attorney, Agent, or Firm* — Merchant & Gould P.C.

(57) ABSTRACT

Methods and compositions are provided for preparation of thermoplastic gels. The compositions have a base composition including a thermoplastic gel and a softener oil and the gel has a hardness between 15 Shore 000 and 65 Shore 000. The gel may also include an additive, such as a mineral filler, (Continued)

an anti-tack agent, and a mixture of a mineral filler and an anti-tack agent. The softener oil may be a high molecular weight oil having a molecular weight greater than about 250 g/mol.

30 Claims, 9 Drawing Sheets

(51) Int. Cl.
C08K 3/01 (2018.01)
C08L 53/00 (2006.01)
C08L 53/02 (2006.01)
C08L 83/04 (2006.01)

(52) U.S. Cl.
CPC ............. *C08L 53/005* (2013.01); *C08L 53/02* (2013.01); *C08L 83/04* (2013.01); *C08J 2353/00* (2013.01); *C08J 2400/10* (2013.01); *C08J 2453/00* (2013.01); *C08J 2483/04* (2013.01); *C08L 2201/08* (2013.01); *C08L 2205/025* (2013.01); *C08L 2205/03* (2013.01); *C08L 2205/035* (2013.01)

(56) References Cited

U.S. PATENT DOCUMENTS

| | | | |
|---|---|---|---|
| 4,248,981 A * | 2/1981 | Milkovich | C08G 81/022 525/250 |
| 4,840,974 A | 6/1989 | Gross et al. | |
| 4,925,899 A * | 5/1990 | Rendina | C08F 297/044 525/250 |
| 5,079,300 A | 1/1992 | Dubrow et al. | |
| 5,099,088 A | 3/1992 | Usami et al. | |
| 5,173,573 A | 12/1992 | Jervis | |
| 5,177,143 A | 1/1993 | Chang et al. | |
| 5,239,723 A * | 8/1993 | Chen | A61C 15/041 15/104.2 |
| 5,262,468 A * | 11/1993 | Chen | A61C 15/041 524/476 |
| 5,330,785 A | 1/1994 | Plaisted et al. | |
| 5,334,646 A * | 8/1994 | Chen | A61C 15/041 132/321 |
| 5,436,298 A * | 7/1995 | Moczygemba | C08F 297/044 525/250 |
| 5,545,690 A * | 8/1996 | Trepka | C08F 297/044 525/250 |
| 5,606,148 A | 2/1997 | Escherich et al. | |
| 5,621,842 A | 4/1997 | Keller | |
| 5,624,294 A * | 4/1997 | Chen | A61C 15/041 446/253 |
| 5,910,530 A | 6/1999 | Wang et al. | |
| 6,012,395 A * | 1/2000 | Saxby | F42B 12/745 102/444 |
| 6,031,053 A * | 2/2000 | Knoll | C08F 297/04 525/314 |
| 6,096,828 A * | 8/2000 | DePorter | C08F 297/044 525/314 |
| 6,197,889 B1 * | 3/2001 | Knoll | C08F 297/04 525/314 |
| 6,242,097 B1 | 6/2001 | Nishiguchi et al. | |
| 6,324,703 B1 | 12/2001 | Chen et al. | |
| 6,372,857 B1 | 4/2002 | Obrecht et al. | |
| 6,521,712 B1 * | 2/2003 | Knoll | C08F 293/00 525/314 |
| 6,552,109 B1 * | 4/2003 | Chen | A01K 97/045 132/321 |
| 6,593,430 B1 * | 7/2003 | Knoll | C08F 297/04 525/271 |
| 6,674,682 B2 | 1/2004 | Ford et al. | |
| RE38,993 E * | 2/2006 | Reedy | C08J 9/127 264/50 |
| 7,060,213 B2 * | 6/2006 | Pearce | A43B 13/04 264/176.1 |
| 7,101,247 B2 * | 9/2006 | Pearce | A23G 3/36 428/355 RA |
| 7,214,735 B2 | 5/2007 | Jego Stora | |
| 7,234,560 B2 * | 6/2007 | Chen | B60R 21/235 180/271 |
| 7,477,826 B2 | 1/2009 | Mullaeney et al. | |
| 7,536,071 B2 | 5/2009 | Paven et al. | |
| 7,737,361 B2 | 1/2010 | Iluspeni et al. | |
| 7,816,427 B2 | 10/2010 | Sohal | |
| 7,994,244 B2 | 8/2011 | Binkley | |
| 8,063,306 B2 | 11/2011 | Zhong et al. | |
| 8,101,862 B2 | 1/2012 | Spruell et al. | |
| 2002/0049276 A1 * | 4/2002 | Zwick | C08L 53/02 524/476 |
| 2002/0188057 A1 * | 12/2002 | Chen | A01K 85/00 524/575 |
| 2003/0022977 A1 * | 1/2003 | Hall | C08L 53/02 524/481 |
| 2003/0083422 A1 * | 5/2003 | Chen | A01K 97/045 524/505 |
| 2004/0063812 A1 | 4/2004 | Sohal | |
| 2004/0063833 A1 * | 4/2004 | Chen | C08L 91/00 524/270 |
| 2004/0070187 A1 * | 4/2004 | Chen | A46B 9/028 280/742 |
| 2005/0272849 A1 | 12/2005 | Clair et al. | |
| 2007/0225427 A1 * | 9/2007 | Wright | C08F 297/04 524/505 |
| 2008/0076854 A1 | 3/2008 | Sohal | |
| 2009/0114336 A1 | 5/2009 | Zhu et al. | |
| 2010/0032069 A1 | 2/2010 | Muller et al. | |
| 2010/0039889 A1 | 2/2010 | Teigen et al. | |
| 2010/0039890 A1 | 2/2010 | Tustin et al. | |
| 2011/0016609 A1 | 1/2011 | Phelps et al. | |
| 2011/0253419 A1 | 10/2011 | Gareis et al. | |
| 2012/0031800 A1 | 2/2012 | Nilson et al. | |
| 2012/0152492 A1 | 6/2012 | Spruell et al. | |
| 2012/0189255 A1 | 7/2012 | Casals et al. | |
| 2012/0192946 A1 | 8/2012 | Becker et al. | |
| 2012/0273496 A1 | 11/2012 | Lourido et al. | |
| 2013/0053486 A1 | 2/2013 | Dower | |

OTHER PUBLICATIONS

Extended European Search Report for corresponding European Patent Application No. 15735000.0 dated Aug. 29, 2017, 5 pages.
International Search Report and Written Opinion for PCT/US2015/010778 dated Apr. 28, 2015 (13 pages).
Micusik et al. "Effect of crosslinking on the properties of composites based on LDPE and conducting organic filler." European Polymer J. vol. 42. (2006) pp. 2379-2388.
Khalf et al. "Use of rice husks as potential filler in styrene butadiene rubber/linear low density polyethlene blends in the prences of maleic anhydride." Materials and Design, vol. 31 (2010) pp. 2414-2421.
Material Safety Data Sheet, Synfluid® Dimer C12, Chevron Phillips Chemical Company IP, 2011, 9 pages total.
Material Safety Data Sheet, Synfluid® Dimer C10, Chevron Phillips Chemical Company LP, 2011, 9 pages total.
INEOS Oligomers Durasyne® 148 Product Datasheet, 2015, 2 pages.

* cited by examiner

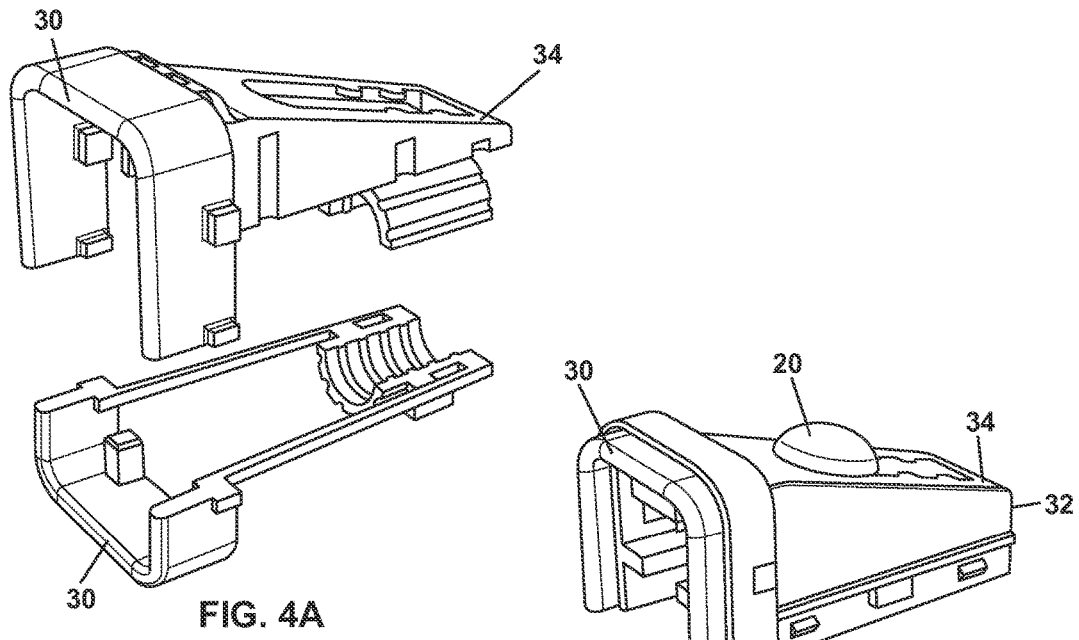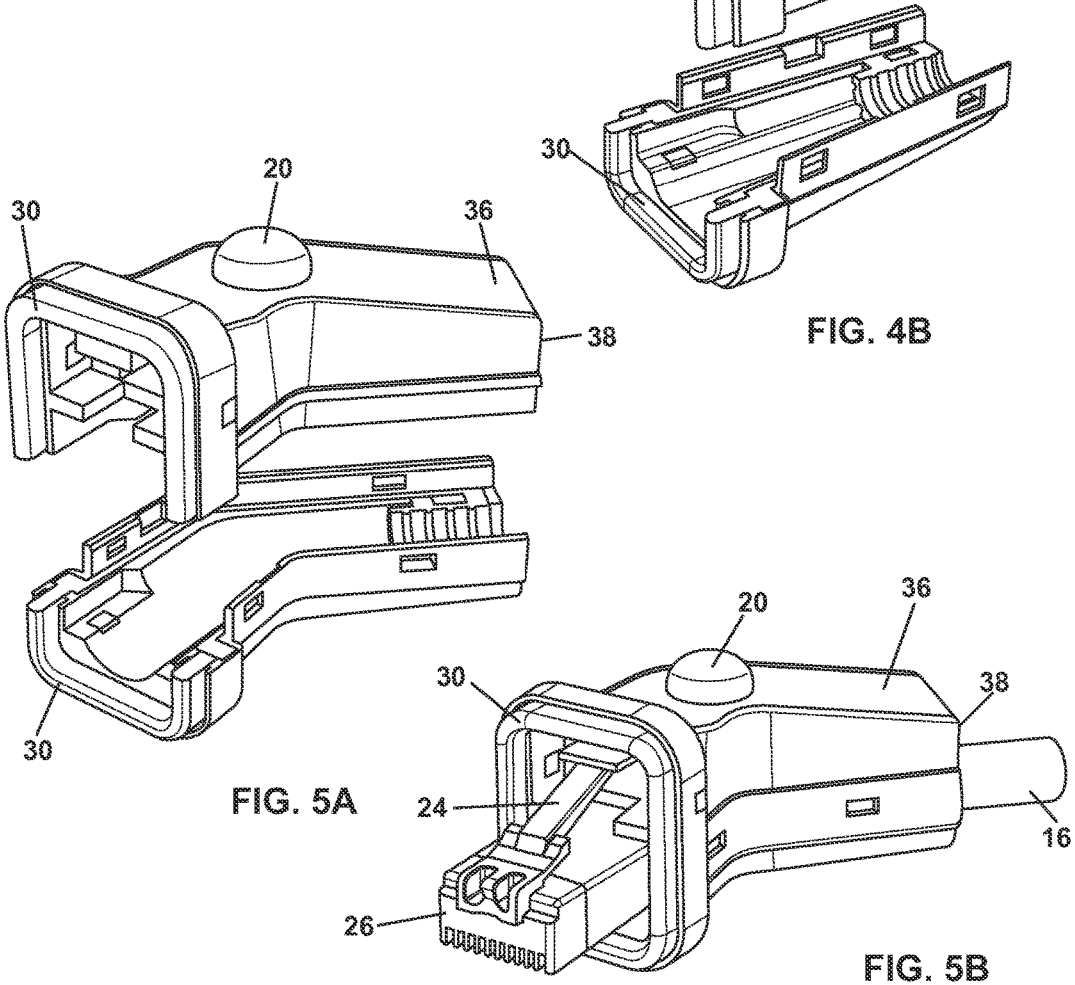

THERMOPLASTIC GEL COMPOSITIONS AND THEIR METHODS OF MAKING

This application is a National Stage entry of International Patent Application No. PCT/US2015/010778, filed on Jan. 9, 2015, which claims the benefit of priority to U.S. Patent Application Ser. No. 61/925,707 filed on Jan. 10, 2014, the disclosure of each of which is incorporated herein by reference in its entirety.

BACKGROUND

Processing thermoplastic rubber gel sealants in a cost effective and efficient manner has presented its challenges. As technology progresses, sealants will be subjected to increasingly higher temperature environments and more demanding performance requirements. There has been, and there presently exists, a need for high performance sealants to meet these demands. For example, there is an increasing need for high service gel sealants for use in outdoor energy transmission applications and for use near or inside engine compartments.

In particular, closure systems are used to protect internal components from degradation caused by external environments. For example, components related to the connections of fiber optics cables, coaxial cables, and copper cables are often enclosed in closure systems. Examples of commercially available closure systems include Fiber Optics Splice Closures (FOSC), the Outdoor Fiber Drop Repair (OFDR), the Outdoor Fiber Distribution Closure (OFDC), and the Fiber optic infrastructure System Technology (FIST). Additional commercially available closure systems include copper joints such as Mechanical Joint Closure (MMC), Toolless Torchless Reentrable Closure (TTRC), and Coax connector closures (GSIC) available from TE Connectivity. These types of closures can be used in aerial, pedestal, and underground environments. Other closure systems are commercially available for use with communication and energy transmission cables.

Closure systems typically include internal components such as fiber organizers, cable seals and termination devices, drop cable seals for a number of drops with drop cable termination devices, universal splice holders for a number of splices, and copper and coax connections. Cable joints may be subject to environmental factors such as varying moisture levels, heat and cold, and exposure to other chemical substances, so the internal components and connections will require appropriate protection from these elements. The closure systems are preferably protected from damage with a sealant of some sort. Conventional sealants, however, suffer from a number of drawbacks that make them less suitable for certain closure systems.

Sealants are often used for insulation and for protection against water, corrosion and environmental degradation, and for thermal management. A number of sealants are known but currently available sealants have certain drawbacks and disadvantages that make them inadequate for specific uses and for use in contact with certain materials. In particular, there is an unmet need for sealants that are suitable for the latest types of fiber optic and electronic closure systems.

Suitable sealing systems for closures are needed for use with a variety of different cables. Traditionally, thermoplastic elastomer gels (TPEGs) have been used as sealants in certain applications due to their unique properties. TPEGs have provided many years of reliable in-field performance for applications requiring a low maximum service temperature of approximately 70° C. TPEGs may comprise a styrene ethylene/butylene styrene ("SEBS") copolymer swollen with an oil softener (e.g., mineral, synthetic, or vegetable oil softeners). A problem, however, with thermoplastic gels used as sealants, and in closure systems in general, is that they often contain high amounts of mineral oil. Conventional thermoplastic gels typically exhibit 20 to 30 wt % oil bleed out. Accordingly there exists an unmet need for gels, sealants, and closure systems with suitable hardness, viscoelastic properties, long-term performance (e.g., >20 years), amongst other properties, including low oil bleed out, better processability by improved melt viscosity, lower shrinkage, and better thermal conductivity.

SUMMARY

Novel thermoplastic gel compositions are disclosed herein. In one aspect, the thermoplastic gel comprises a base composition consisting of a thermoplastic rubber and softener oil. The gel further comprises at least one additive selected from the group consisting of a mineral filler, an anti-tack agent, and mixtures thereof, wherein the base composition and at least one additive define an overall composition, and wherein the gel has the following properties: (a) a hardness between 15 Shore 000 and 65 Shore 000; and (b) less than 10% oil bleed out after being under compression of 1.2 atm for 60 days at 70° C.

In a second aspect, the thermoplastic gel comprises a base composition consisting of a thermoplastic rubber and a softener oil, wherein the softener oil is a high molecular weight oil having a molecular weight greater than 250 g/mol, and wherein the gel has the following properties: (a) a hardness between 15 Shore 000 and 65 Shore 000; and (b) less than 10% oil bleed out after being under compression of 1.2 atm for 60 days at 60° C.

In a further aspect, the thermoplastic gel comprises a base composition consisting of a thermoplastic rubber and a softener oil, wherein the softener oil is a high molecular weight oil having a molecular weight greater than 250 g/mol, and wherein the gel has the following properties: (a) a hardness between 30 Shore 000 and 45 Shore 000; and (b) less than 10% oil bleed out after being under compression of 1.2 atm for at least 26 days at 70° C.

In some embodiments, a thermoplastic gel is provided comprising a base composition consisting of a thermoplastic rubber and a softener oil; and at least one additive selected from the group consisting of a mineral filler, an anti-tack agent, and mixtures thereof, wherein the base composition and at least one additive define an overall composition, and wherein the gel has a hardness between 15 Shore 000 and 65 Shore 000. In some embodiments, the gel exhibits less than 20 wt %, less than 15 wt %, or less than 10 wt % oil bleed out after being under compression of 1.2 atm for at least 25 days at 70° C.

In some embodiments, a thermoplastic gel is provided comprising a thermoplastic rubber comprising a styrenic block copolymer. In some aspects, the styrenic block copolymer is a styrene-ethylene/butylene-styrene or styrene-ethylene/propylene-styrene copolymer.

In some embodiments, a thermoplastic gel is provided comprising a mineral filler between 0.1 wt % and 50 wt % of the overall composition. In some embodiments, the mineral filler is selected from the group consisting of talc, calcium carbonate, clay, wollastonite, silicates, glass, and combinations thereof. In a specific embodiment, the mineral filler is talc. In some aspects, the talc is present in approximately 30 wt % of the overall composition.

In some embodiments, a thermoplastic gel is provided comprising an anti-tack agent between 0.1 wt % and 10 wt % of the overall composition. In some embodiments, the gel composition comprises the anti-tack agent is selected from the group consisting of a silicone, silane, siloxane, or copolymer thereof.

In some embodiments, a thermoplastic gel is provided comprising a mineral filler selected from the group consisting of talc, calcium carbonate, clay, wollastonite, silicates, glass, and combinations thereof, and an anti-tack agent selected from the group consisting of a silicone, silane, siloxane, or copolymer thereof; and wherein the mineral filler is between 0.1 wt % and 50 wt % of the overall composition and the anti-tack agent is between 0.1 wt % and 10 wt % of the overall composition.

In some embodiments, a gel composition is provided that comprises a thermoplastic rubber comprising (a) a base polymer having at least one functional group capable of crosslinking, (b) a functionalized extender, and (c) an optional crosslinker having multiple functional groups that are compatible and willing to react with the functional groups in the base polymer or the functionalized extender.

In some embodiments, a gel composition is provided that comprises a softener oil that is a high molecular weight oil having a molecular weight greater than 250 g/mol. In some embodiments, the gel composition comprises a high molecular weight oil is derived from one of the following: a mineral oil, a paraffin oil, a naphthenic oil, an aromatic oil, a poly-alpha olefin, or a combination thereof.

In some embodiments, a gel composition is provided that comprises a softener oil hat is a high molecular weight oil and a mineral filler selected from the group consisting of talc, calcium carbonate, clay, wollastonite, silicates, glass, and combinations thereof; and wherein the mineral filler is between 0.1 wt % and 50 wt % of the overall composition. In some aspects, the mineral filler is talc, and wherein the talc comprises approximately 30 wt % of the overall composition.

In some embodiments, a thermoplastic gel is provided comprising a softener oil hat is a high molecular weight oil and an anti-tack agent selected from the group consisting of a silicone, silane, siloxane, or copolymer thereof; and wherein the anti-tack agent is between 0.1 wt % and 10 wt % of the overall composition.

In some embodiments, a thermoplastic gel is provided comprising an additional additive selected from the group consisting of flame retardants, coloring agents, adhesion promoters, dispersants, flow improvers, plasticizers, toughening agents, and combinations thereof.

In some embodiments, a thermoplastic gel is provided comprising a stabilizer at between 0.1 wt % and 5 wt % of the overall composition, wherein the stabilizer is selected from the group consisting of an antioxidant, acid-scavenger, light and UV absorber/stabilizer, heat stabilizer, metal deactivator, free radical scavenger, carbon black, antifungal agent, and mixtures thereof.

In another embodiment, a thermoplastic gel is provided comprising a base composition consisting of a thermoplastic rubber and a softener oil, wherein the softener oil is a high molecular weight oil having a molecular weight greater than 250 g/mol, and wherein the gel has a hardness between 15 Shore 000 and 65 Shore 000, and wherein the gel exhibits less than 10% oil bleed out after being under compression of 1.2 atm for 26 days at 70° C.

In another embodiment, a thermoplastic gel is provided comprising a base composition consisting of a thermoplastic rubber and a softener oil, wherein the softener oil is a high molecular weight oil derived from a mineral oil, a paraffin oil, a naphthenic oil, an aromatic oil, a poly-alpha olefin, or a combination thereof. In some aspects, the softener oil is a high molecular weight oil derived from a paraffin oil, a naphthenic oil, an aromatic oil, a poly-alpha olefin, or a combination thereof. In some embodiments, a thermoplastic gel is provided comprising a softener oil that is a high molecular weight oil derived from a mineral oil, a paraffin oil, a naphthenic oil, an aromatic oil, a poly-alpha olefin, or a combination thereof.

In some embodiments, a method of making a thermoplastic gel is provided comprising mixing a base composition consisting of a thermoplastic rubber, a softener oil, and at least one additive selected from the group consisting of a mineral filler, an anti-tack agent, and mixtures thereof, wherein the base composition and at least one additive define an overall composition; and providing heat to form the thermoplastic gel, wherein the resultant thermoplastic gel has a hardness between 15 Shore 000 and 65 Shore 000.

In some embodiments, a method for creaking a thermoplastic is provided wherein the gel exhibits less than 20 wt %, less than 15 wt %, or less than 10 wt % oil bleed out after being under compression of 1.2 atm for at least 25 days at 70° C.

BRIEF DESCRIPTION OF THE FIGURES

FIGS. 4a and 4b are depictions of a straight two piece housing assembly designed for axial sealing.

FIGS. 5a and 5b are depictions of an angled two piece housing assembly designed for axial sealing.

DETAILED DESCRIPTION

Figure 1:
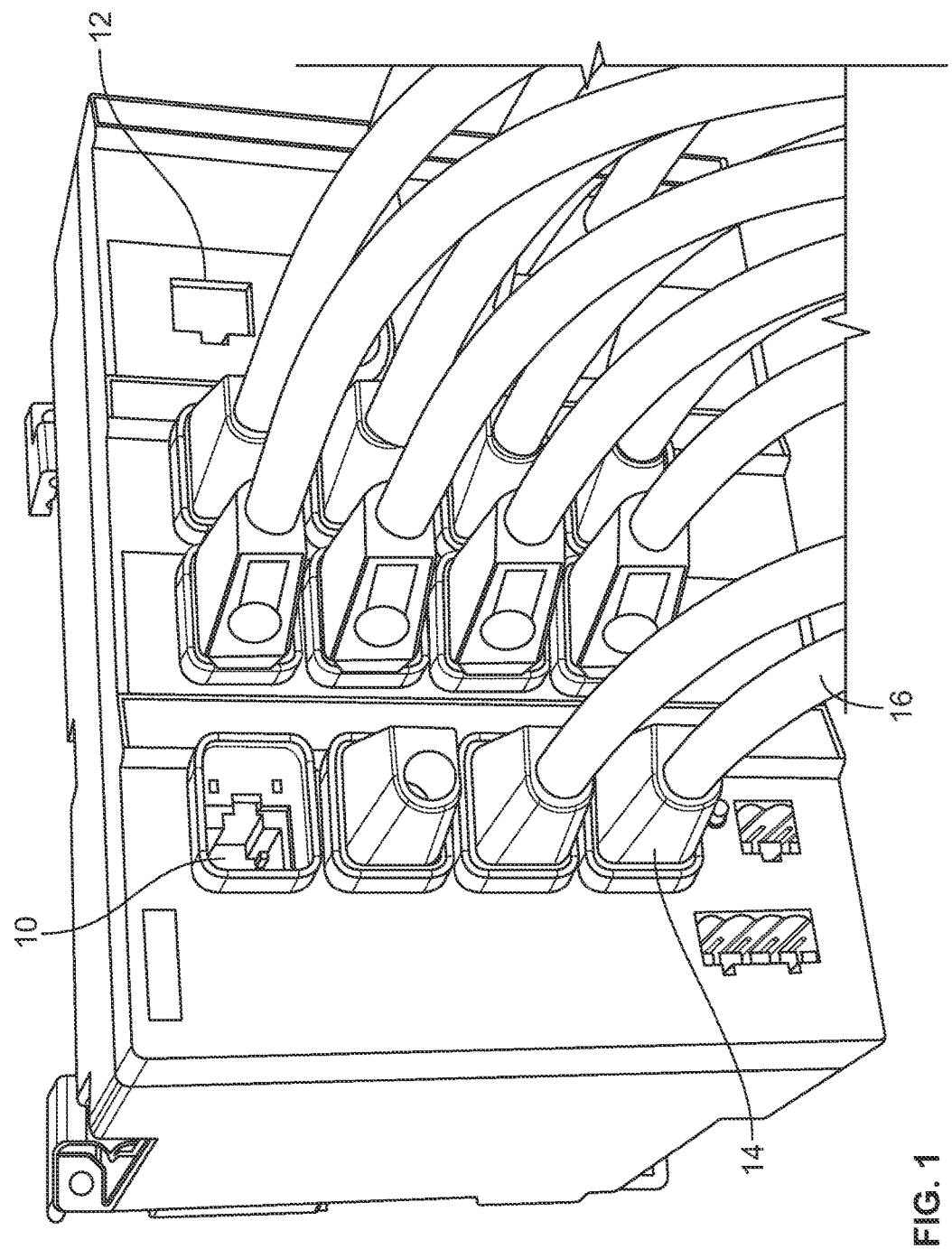
FIG. 1 is a depiction of an interconnect system having a connection hub having multiple connection ports or receptacles for the connector, housing, and cable components to be connected.

As used herein, terms such as "typically" are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the disclosure.

As used herein, "mix," "mixed," or "mixture" refers broadly to any combining of two or more compositions. The two or more compositions need not have the same physical state; thus, solids can be "mixed" with liquids, e.g., to form a slurry, suspension, or solution. Further, these terms do not require any degree of homogeneity or uniformity of composition. Thus, such "mixtures" can be homogeneous or heterogeneous, or can be uniform or non-uniform. Further, the terms do not require the use of any particular equipment to carry out the mixing, such as an industrial mixer.

As used herein, "optionally" means that the subsequently described feature(s) or event(s) may or may not be present or occur. For example, in some embodiments, an optional event may not occur. In other embodiments, the optional event occurs one or more times.

As used herein, "comprise," "comprises," "comprising," or "comprised of" refer to groups that are open, meaning that the group can include additional members in addition to those expressly recited. For example, the phrase, "comprises A" means that A must be present, but that other members can also be present. The terms "include," "have," "contain," and "composed of," and their grammatical variants, have the same meaning. In contrast, "consist of," "consists of," or "consisting of" refer to groups that are closed. For example, the phrase "consists of A" means that A and only A is present.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., A1 and A2, then one or more members of the class can be present concurrently.

As used herein, "providing" is to be construed as having its broadest reasonable scope. For example, providing a composition that comprises a particular compound includes, but is not limited to, adding the compound to the composition, generating the compound in the composition via a chemical reaction, or receiving the composition, e.g., as the product of another process.

As used herein, the term "polymer" may refer to a polymeric compound prepared by polymerizing monomers, whether of the same or a different type. The generic term "polymer" embraces the terms "homopolymer," "copolymer," "terpolymer," and the like.

As used herein, the term "base composition" may refer to the thermoplastic gel composition consisting of (1) thermoplastic rubber comprising a base polymer and optionally a functionalized extender and/or crosslinker, and (2) softener oil.

As used herein, the term "overall composition" or "overall thermoplastic gel composition" may refer to the combination of the base composition and any additives or components in addition to the base composition, such as (but not limited to) stabilizers, mineral fillers, and/or anti-tack agents.'

As used herein, the term "high molecular weight oil" may refer to a softener oil composition having a molecular weight greater than about 250 g/mol. In some embodiments, the high molecular weight oil has a molecular weight greater than 250 g/mol, 400 g/mol, or 500 g/mol, and less than 2,000 g/mol, 1,500 g/mol, 1,200 g/mol, 1,000 g/mol, 900 g/mol, 800 g/mol, 700 g/mol or 600 g/mol. In some embodiments, the high molecular weight oil has a molecular weight between 250 g/mol and 1,500 g/mol, between 400 g/mol and 900 g/mol, or between 500 g/mol and 800 g/mol.

As used herein, the term "functionalized extender" may refer to any compound having a functional group that is compatible and willing to react with a functional group in the base polymer or the crosslinker/coupling agent. In certain embodiments, the term refers to any compound comprising a single functional site that is capable of forming a connection to a base polymer or a crosslinker/coupling agent. In certain embodiments, the functionalized extender is a maleated extender, such as maleated polyisobutylene.

Any concentration range, percentage range, or ratio range recited herein is to be understood to include concentrations, percentages, or ratios of any integer within that range and fractions thereof, such as one tenth and one hundredth of an integer, unless otherwise indicated. Also, any number range recited herein relating to any physical feature are to be understood to include any integer within the recited range, unless otherwise indicated. It should be understood that the terms "a" and "an" as used above and elsewhere herein refer to "one or more" of the enumerated components. For example, "a" polymer refers to one polymer or a mixture comprising two or more polymers.

In certain embodiments, the thermoplastic gel composition comprises: (1) a thermoplastic rubber comprising a base polymer and optionally a functionalized extender and/or crosslinker, (2) a softener oil, and (3) optionally, various additives. In order to improve the processability of these gel compositions, as well as extend their functional capabilities, the thermoplastic rubber, the softener oil, and the optional additives may be blended together in order to improve or maintain thermoplastic gel properties, such as reduced tackiness, lower melt temperature or melt viscosity, improved thermal conductivity (to reduce cooling time in the mold), or same or improved oil retention under pressure (i.e., reduced oil bleed out).

In some embodiments, the softener oil in the gel composition is a high molecular weight oil. In some embodiments, the additive comprises a mineral filler. In other embodiments, the additive comprises an anti-tack agent. Additionally, in certain embodiments, the gel composition includes the combination of (1) a high molecular weight oil and a mineral filler additive, (2) a high molecular weight oil and an anti-tack agent additive, (3) mineral filler and anti-tack agent additives, or (4) a high molecular weight oil combined with mineral filler and anti-tack agent additives.

In some embodiments, a thermoplastic gel composition is provided comprising 50-80 wt % synthetic hydrocarbon softener oil, 15-30 wt % thermoplastic rubber comprising a styrenic-rubber block copolymer, and 0.1-5 wt % of a stabilizer. In some embodiments, the synthetic hydrocarbon softener oil is a high molecular weight oil.

In some embodiments, a thermoplastic gel composition is provided comprising 50-80 wt % of a softener oil, 10-30 wt % thermoplastic rubber comprising a styrenic-rubber block copolymer, and at least one additive selected from the group consisting of a mineral filler, an anti-tack agent, and mixtures thereof. In some embodiments, the softener oil is a white mineral oil or a In some embodiments, a thermoplastic gel is provided by a method comprising mixing the components to form a composition, and heating the composition to form a thermoplastic gel, wherein the thermoplastic gel exhibits less than about 20, 15 or 10 wt % oil bleed out under compression of 12.0 kPa (1.2 atm) at 70° C. over a period of about 25, 30, 45 or 60 days.

In some embodiments, thermoplastic gels are provided that exhibit a Shore 000 hardness of from 30 to 45: a range of stress relaxation (60 s value) of from 12-30%; a tensile strength in a range from 0.40 to 1 MPa; and an elongation to Break (%) in a range from 1000-2300%.

In some embodiments, thermoplastic gels are provided that exhibit less than 20 wt %, less than 15 wt % oil bleed out, or less than 10 wt % oil bleed over a period of 60 days under compression of 1.2 atm at 70° C.

In some embodiments, thermoplastic gels are provided that exhibit less than less than 10 wt % oil bleed out over a period of at least 25 days under compression of 1.2 atm at 70° C.

In some embodiments, thermoplastic gels are provided that are prepared from a composition comprising a thermoplastic rubber and a softener oil, and at least one additive selected from the group consisting of a mineral filler, an anti-tack agent, a stabilizer, and mixtures thereof, wherein the gels exhibit less than 10 wt % oil bleed out under 120 kPa at 70° C. over a period of at least 26 days, while retaining favorable gel properties including a range of Shore 000 hardness of from 32 to 44; and a range of stress relaxation (60 s value) of from 13-28%; a tensile strength in a range from 0.41 to 1 MPa; and elongation to Break (%) in a range from 1000-2300%. In some embodiments, the softener oil is a high molecular weight synthetic hydrocarbon.

In some embodiments, methods of making thermoplastic gels are provided, comprising mixing a composition comprising a thermoplastic rubber and a softener oil, and at least one additive selected from the group consisting of a mineral filler, an anti-tack agent, a stabilizer, and mixtures thereof; and heating the composition to form the thermoplastic gels, wherein the gels exhibit less than 10 wt % oil bleed out under 120 kPa at 70° C. over a period of at least 26 days, while retaining favorable gel properties including a range of Shore 000 hardness of from 32 to 44; and a range of stress relaxation (60 s value) of from 13-28%; a tensile strength in a range from 0.41 to 1 MPa; and elongation to Break (%) in a range from 1000-2300%. In some embodiments, the softener oil is a high molecular weight synthetic hydrocarbon.

In some embodiments, thermoplastic gels are provided comprising a thermoplastic rubber and a softener oil, and at least one additive selected from the group consisting of a mineral filler, an anti-tack agent, a stabilizer, and mixtures thereof, wherein the gels exhibit less than 10 wt % oil bleed out under 120 kPa at 70° C. over a period of at least 26 days, while retaining favorable gel properties including a range of Shore 000 hardness of from 32 to 44; and a range of stress relaxation (60 s value) of from 13-28%; a tensile strength in a range from 0.41 to 1 MPa; and elongation to Break (%) in a range from 1000-2300%. In some embodiments, the softener oil is a high molecular weight synthetic hydrocarbon.

Making the Thermoplastic Gel

In one embodiment, a method of making a thermoplastic gel is provided, comprising mixing a base composition consisting of a thermoplastic rubber, a softener oil and at least one additive selected from the group consisting of a mineral filler, an anti-tack agent, a stabilizer, and mixtures thereof, wherein the base composition and at least one additive define an overall composition, and providing heat to the overall composition to form the thermoplastic gel; wherein the resultant thermoplastic gel exhibits a hardness between 15 Shore 000 and 65 Shore 000. In some embodiments, the thermoplastic gel exhibits a hardness between 30 Shore 000 and 45 Shore 000. In some embodiments, a thermoplastic gel made by the method exhibits less than 20 wt %, less than 15 wt %, or less than 10% oil bleed out after being under compression of 1.2 atm for a time period of over 25 days (600 hrs) at 70° C.

In some embodiments, a method of creaking a thermoplastic gel is provided, comprising mixing a base composition consisting of a thermoplastic rubber comprising a softener oil and at least one additive selected from the group consisting of a mineral filler, an anti-tack agent, and mixtures thereof, wherein the base composition and at least one additive define an overall composition, and providing heat to the overall composition to form the thermoplastic gel.

In further embodiments, a method of making a thermoplastic gel is provided comprising mixing a base composition consisting of a thermoplastic rubber and a softener oil, wherein the softener oil is a high molecular weight oil having a molecular weight greater than 250 g/mol, and providing heat to the overall composition to form the thermoplastic gel, wherein the gel has a hardness between 15 Shore 000 and 65 Shore 000.

In certain embodiments, the thermoplastic gel composition is made by a method comprising blending a base composition of thermoplastic rubber and softener oil at ambient temperature. In some embodiments, the base composition is made by a method comprising mixing (1) greater than 1 wt %, 2 wt %, 3 wt %, 4 wt %, or 5 wt %, and less than 50 wt %, 45 wt %, 40 wt %, 35 wt %, 30 wt %, 25 wt %, 20 wt %, or 15 wt % of the thermoplastic rubber with (2) greater than 50 wt %, 60 wt %, 70 wt %, or 80 wt %, and less than 99 wt %, 95 wt %, 90 wt %, or 85 wt % of the softener oil, wherein the combined wt % of the thermoplastic rubber and softener oil add up to 100 percent of the base composition. In some embodiments, the base composition is made by a method comprising mixing approximately 1-49 wt %, 5-40 wt %, or 5-20 wt % of a thermoplastic rubber with approximately 51-99 wt %, 50-80 wt %, 60-95 wt %, or 80-95 wt % of a softener oil, wherein the combined wt % of the thermoplastic rubber and softener oil add up to 100 percent of the base composition.

In certain embodiments, the method of making comprises mixing the gel components together at an elevated temperature (i.e., greater than room temperature) for a certain period of time. The temperature and time at temperature may be adjusted accordingly to target the end properties desired in the gel. Several of those properties are discussed in the section below labeled "Uses and Properties of the Thermoplastic Gel, and Testing Methods." In certain embodiments, the mixing and reacting is conducted at an elevated temperature between about 100-250° C., about 150-220° C., about 180-200° C. or about 200-250° C. Typically, the mixing and reacting is not conducted at a temperature that is above the flashpoint of any of the components.

In some embodiments, the mixing at the elevated temperature is held for a period of time greater than approximately 1 minute, 5 minutes, 10 minutes, 30 minutes, 1 hour, 2 hours, or 3 hours, and less than 24 hours, 12 hours, 8 hours, or 6 hours. In some embodiments, the mixing at the elevated temperature is held for a period of time of approximately 10 minutes, 30 minutes, or between 1 minute and 24 hours, 1-12 hours, 2-8 hours, or 3-6 hours. In some embodiments, the period of time is on the order of approximately 1 minute, 5 minutes, 10 minutes, 30 minutes or 1 hour, and processing/mixing is conducted via injection molding of a pre-blended slurry, which may be more cost effective and avoid degradation of the composition.

In certain embodiments, the thermoplastic rubber comprises a base polymer that has been reacted with a functionalized extender and/or crosslinker component to extend the length or add side chains to the base polymer. In some embodiments, no catalyst or initiator is needed other than heat to react the base polymer, functionalized extender, and/or crosslinker together. For example, certain ionic crosslinkers (described below in greater detail) may only need heat and time to react and form the gel component. In other embodiments, a catalyst or initiator may be used to react the base polymer, functionalized extender, and/or crosslinker together.

In some embodiments, no functionalized extender component is employed in the thermoplastic rubber.

In some embodiments, no crosslinker component is employed in the thermoplastic rubber.

In certain embodiments, at least one additive is added to the base composition, wherein the at least one additive is between about 0.1-75 wt % of the overall composition (i.e., base composition plus additives), about 1-50 wt % of the overall composition, about 5-40 wt % of the overall gel composition, about 15-30 wt % of the overall composition, about 0.1-10 wt % of the overall gel composition, about 0.5-5 wt % of the overall gel composition, or about 1-3 wt % of the overall gel composition.

In one embodiment, the at least one additive is a mineral filler, wherein the filler is between about 0.1-50 wt % of the overall composition, about 5-40 wt % of the overall gel composition, or about 15-30 wt % of the overall composition. In another embodiment, an anti-tack agent is added to the gel composition, wherein the anti-tack agent is between about 0.1-10 wt % of the overall gel composition, about 0.2 and 5 wt % of the overall composition, or about 0.5 and 2 wt % of the overall composition. In yet another embodiment, one or more stabilizer agents are added to the gel composition. Further potential additives are described in further detail below.

Base Polymer/Thermoplastic Rubber

In some embodiments, the thermoplastic rubber comprises greater than 1 wt %, 2 wt %, 3 wt %, 4 wt %, or 5 wt %, and less than 50 wt %, 45 wt %, 40 wt %, 35 wt %, 30 wt %, 25 wt %, 20 wt %, or 15 wt % of the base composition. In other embodiments, the thermoplastic rubber comprises approximately 1-49 wt %, 5-40 wt %, or 5-2.0 wt % of the base composition In certain embodiments, the base polymer in the thermoplastic rubber is a styrenic-rubber block copolymer (e.g. diblock and triblock polymers). In certain embodiments, the styrenic block copolymer is a styrene-ethylene/butylene-styrene ("SEBS/SEB"), styrene-ethylene/propylene-styrene ("SEPS/SEP") copolymer or styrene butadiene styrene (SBS/SB). In yet other embodiments, the base polymer is an olefinic block copolymer, such as those described in U.S. Patent Application Publication No. 2012/0130011, herein incorporated by reference in its entirety. For example, the olefinic block copolymers may be an elastomeric copolymer of polyethylene, sold under the trade name INFUSE by The Dow Chemical Company of Midland, Mich. (e.g., INFUSE 9107). In one embodiment, the olefinic block copolymer is selected from the group consisting of INFUSE OBC 9000, INFUSE OBC 9007, INFUSE OBC 9100, INFUSE OBC 9107, INFUSE OBC 9500, INFUSE OBC 9507, INFUSE OBC 9530, INFUSE OBC 9807, INFUSE OBC 9817, and mixtures thereof.

In other particular examples, the base polymer may be any such configured polymer such as those available from Kraton Polymers (Houston, Tex.), including but not limited to: Kraton MD6684, RP6684, FG190, FG1924, RP6670, 1901, 1901X, B 51-4, FG 120LX, FG 1652, FG 19, FG 1900X, FG 1901, FG 1901X, FG 1901X951, FG 1921X, FG 1924, FG 1924X, FG 1961X, G 1901, G 1901X, G 1901X2, G 1921, GRP 6627, KG 1901, M 1923, MB 1000, RP 6509, RP 6510, RP 6543, RP 6562. In other embodiments, the base polymer may be at least one of the following available from Asahi Kasei Elastomer (Tokyo, Japan): Asahi M 1913, M 1943, and M 1953. In yet other embodiments, the base polymer or thermoplastic rubber is a diblock or a triblock polymer sold under the trade name Septon (e.g., Septon 1020 (diblock) or Septon S2006 (triblock)).

In other embodiments, the base polymer may further include at least one of the following commercially available copolymers, including hydrogenated styrenic block copolymers such as the polystyrene-poly(ethylene-propylene) diblock copolymers available from Kraton Polymers as KRATON G1701 and G1702; the polystyrene-poly(ethylene-butylene)-polystyrene triblock copolymers available from Kraton Polymers as KRATON G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as KRATON RP-6935 and RP-6936, the polystyrene-poly-(ethylene-propylene)-polystyrene triblock copolymers available from Kraton Polymers as KRATON G1730; the polystyrene-poly(ethylene-butylene)-polystyrene triblock copolymer comprising 67 wt % polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and 2000; the polystyrene-polybutadiene-poly(styrene-butadiene)-polybutadiene block copolymer available from Asahi Kasei Elastomer as S.O.E.-SS L601; the polystyrene-poly(ethylene-butylene)-polystyrene triblock copolymer comprising about 60 wt % polystyrene available from Kuraray as SEPTON S8104; the polystyrene-poly(ethylene-ethylene/propylene)-polystyrene triblock copolymers available from Kuraray SEPTON® S4044, S4055, S4077, and S4099; and the polystyrene-poly(ethylene-propylene)-polystyrene triblock copolymer comprising about 65 wt % polystyrene available from Kuraray as SEPTON® S2104. Mixtures of two or more block copolymers may be used. Illustrative commercially available unhydrogenated block copolymers include the Kraton D series polymers, including KRATON D1101 and D1102, from Kraton Polymers, and the styrene-butadiene radial teleblock copolymers available as, for example, K-RESIN KR03, KR05, and KR10 sold by Chevron Phillips Chemical Company. In another embodiment, the styrenic block copolymer is a mixture of high melt viscosity SEBS block copolymer and a functionalized SEBS block copolymer.

In another embodiment, the base polymer comprises maleic anhydride grafted to the block copolymer. The maleated functional groups are examples of functional groups configured for crosslinking during gel processing. These maleated base polymers are particularly configured for crosslinking with extenders, di- and multi-amine crosslinkers, di- and multifunctional epoxies, di- and multifunctional hydroxyl molecules (alcohols and polyols) as well as aluminum, titanium and other organometallic compounds. In some embodiments, the maleated base polymer includes at least one functional group configured to chemically crosslink with a di- and multi-amine crosslinker.

For further example, the maleated functional groups of a maleic anhydride-modified SEBS or SEPS are configured for crosslinking. Not wishing to be bound by theory, but it is believed that chemical crosslinking of the SEBS or SEPS triblocks at the ethylene-butylene or ethylene-propylene blocks further strengthens the gel structure. The chemical crosslinking produced is capable of raising its softening temperature.

Methods of preparing maleated block copolymers are known in the art and many such block copolymers are commercially available. For example, maleated block copolymers are disclosed in EP 0879832A1. Illustrative commercially available maleic anhydride-modified SEBS are available from Kraton Polymers (Houston, Tex.) as KRATON FG1901 (SEBS polymer having a polystyrene content of about 30 wt % and maleic anhydride grafted content of about 1.4-2.0 wt %) and KRATON FG 1924 G (SEBS polymer with about 13 wt %, polystyrene and maleic anhydride grafted content of about 0.7-1.3 wt %), and KRATON MD 6684 CS (SEBS polymer having a polystyrene content of about 30 wt % and maleation level of about 1.0 wt %), and KRATON MD 6670, Illustrative commercially available maleic anhydride-modified SEBS are available from Asahi Chemical Industry Co., Ltd. (Tokyo, Japan) under the trade name M-1911 (maleation level of about 3.0 wt %), M-1913 (maleation level of about 2.0 wt %), and M-1943.

In one embodiment, the maleic anhydride modified SEBS is KRATON MD6684CS. In another embodiment, the maleic anhydride-modified SEBS is KRATON FG6684. In yet another embodiment, the maleic anhydride modified SEBS is selected from the group consisting of as KRATON FG 1901, KRATON FG 1924 G, KRATON MD 6684 CS, and KRATON MD 6670. In another embodiment, the maleic anhydride-modified SEBS has a maleation level of between about 1.0 wt % and about 3.0 wt %.

In certain embodiments, the base polymer comprises at least one functional group configured to chemically crosslink in the presence of a functionalized extender or crosslinker, such as those described in U.S. patent application Ser. No. 13/955,243, filed Jul. 31, 2013, and herein incorporated by reference. For example, the base polymer may have functional groups such as acyls, hydroxyls, sulfhydryls, amities, carboxyls, anhydrides, olefins, and carboxylic acids configured to chemically link in the presence of an extender or crosslinker.

In certain embodiments, the thermoplastic gel includes a functionalized extender capable of forming a connection with the base polymer and "extending" the length of the base polymer. In certain embodiments, the functionalized extender comprises at least one functional group that is compatible and willing to react with a functional group in the base polymer or the crosslinker/coupling agent. In certain embodiments, the functionalized extender may be any compound that comprises a functional site that is capable of forming a connection to the base polymer or the crosslinker/coupling agent. The functional group may be an olefin, for example.

In some embodiments, the functionalized extender comprises an internal olefin. In other embodiments, the functionalized extender comprises a terminal double bond (a-olefin). In certain embodiments, the functionalized extender includes only one functional group. In some embodiments, the functionalized extender comprises a single, terminal olefin. Not wishing to be bound by theory, but it is believed that when the functionalized extender includes only one functional group per molecule (such as a terminal double bond), then a highly crosslinked structure can be prevented by the stoichiometry of the components, and the resulting gel can be melt processed more readily. A functionalized extender containing only one functional group can assist in locking the extender into the gel structure and prevent the extender from bleeding out as readily as similar gels made with non-functionalized (non-reactive) extenders.

In other embodiments, the functionalized extender comprises more than one functional group. The functionalized extender may comprise a compound having more than one olefinic site, such as a butadiene. In one particular embodiment, the functionalized extender comprises a carboxy-terminated butadiene compound.

In certain embodiments, the extender can be locked into the gel structure either by making it physically or chemically attracted to the polymeric or functional portion of the base polymer, or by adding a crosslinker (or coupling agent) that connects the functionalized extender to the base polymer. In a preferred embodiment, the functionalized extender is connected to the base polymer (either directly or through a coupling agent) in only one location per extender molecule.

In some embodiments, the functionalized extender is selected from the group consisting of: polyisobutylene, unsaturated hydrocarbon oils, unsaturated paraffin, alkenes or olefins (mineral or synthetic), unsaturated naturals oils such as castor, linseed, soybean, peanut, esters or phthalate esters, polybutadiene, polyisoprene, poly(butadiene/styrene) copolymers, other liquid rubbers, and mixtures thereof. In one embodiment, the functionalized extender is polyisobutylene (PIB).

In certain embodiments, the functionalized extender is a maleated extender, such as maleated polyisobutylene or maleated polybutadiene. In one particular embodiment, the functionalized extender is maleated polyisobutylene. In some embodiments, the extender compound is reacted maleic anhydride to form a maleated extender. In one particular example, about 45 g of maleic anhydride is added to about 500 g of heated polyisobutylene (TPC 595 from Texas Petrochemicals, Houston, Tex.), wherein the reaction is carried out at about 190° C. for about 6 hours. The hot maleated polyisobutylene is then filtered through a 200 mesh filter to remove any charred particles, and then put in sealed glass containers under dry nitrogen. The resulting composition was approximately 80% maleated as determined by the stoichiometry of the ingredients and average molecular weight of the polyisobutylene. Other functionalized extenders (including other polyisobutylene compositions such as Indopol® H100 polyisobutylene, INEOS Oligomers, League City, Tex., or Glissopal 1300 from BASF) may also be maleated using a similar procedure.

In certain embodiments, the thermoplastic gel includes a crosslinker or coupling agent that is capable of forming connections between the base polymer chains, between the base polymer and functionalized extender, or between functionalized extenders. In certain embodiments, the crosslinker comprises multiple (2 or more) functional groups that are compatible and willing to react with the functional groups in the base polymer or functionalized extender. In certain embodiments, the crosslinker comprises between three and ten functional groups that are capable of forming a connection point between three and ten base polymers or functionalized extenders, such that the crosslinker functions as a branching agent. In another embodiment, the crosslinker comprises four functional groups that are capable of forming a connection point between four different base polymers or functionalized extenders.

Any crosslinker capable of reacting with the functionalized base polymer regions can be utilized, such as covalent bond crosslinking (covalent crosslinkers) or ionic bond crosslinking (ionic crosslinkers).

In certain embodiments, the crosslinker is an ionic crosslinker, which may allow for improved re-melting or re-processing the gel by breaking or disassociating the bond at an elevated temperature. In certain embodiments, an ionic crosslinked gel may be re-melted or reprocessed by placing the gel sample in a picture frame mold (in some cases, a mold that is has dimensions of about 200 mm by about 200 mm by about 3 mm with sheets of release paper or film on each side of the gel samples, wherein the total amount of gel placed in the mold is 60 g). The material may then be pressed in a heated hydraulic press for about 2-3 minutes (or until melted) at about 180° C. and about 10,000 pounds of force. The sample may then be cooled to room temperature and removed. Samples of other shapes can be molded in a manner similar to injection molding plastic. In some embodiments, the re-melting/re-processing temperatures may range between about 190° C. and about 230° C., and the pressures may range between about 300 psi and about 1,000 psi depending on the size and geometry of the sample. Plastic injection molding machines, pressurized drum melters, and gear pumps may all be used to melt gel and pressurize the gel to force it into the desired mold.

In some embodiments, the ionic crosslinker is a metal salt. Organic metal salts may aid in coupling the (maleated) extender to the base polymer molecules. In certain embodiments, the metal salt is a lithium, sodium, calcium, aluminum, or zinc organic metal salts, in one embodiment, the ionic crosslinker is a calcium salt (such as Licomont® CaV 102).

In one embodiment, the ionic crosslinker is aluminum acetylacetonate. In further embodiments, the ionic crosslinker is selected from the group consisting of aluminum acetylacetonate, iron acetylacetonate, zinc acetylacetonate, titanium acetylacetonate and zirconium acetylacetonate, and mixtures thereof. In one embodiment, the crosslinker is an aluminum salt of acetic acid. For example, the crosslinker may be an aluminum triacetate $(Al(C_2H_3O_2)_3)$, aluminium diacetate, $(HO(Al(C_2H_3O_2)_3)$, or aluminium monoacetate, $((HO)_2(Al(C_2H_3O_2)_3)$. In another embodiment, the crosslinker is tetra(2-ethylhexyl)titanate.

In certain embodiments, the chemical crosslinking involves covalent crosslinking (or a covalent crosslinker). Non-limiting examples of covalent crosslinkers include primary, secondary, or tertiary amines, epoxies, hydroxyl-terminated butadienes, polymeric di-isocynates, and mixtures thereof.

In other embodiments, the covalent crosslinker is an amine crosslinker. In further embodiments, the amine crosslinker is selected from the group consisting of an organic amine, an organic diamine, and an organic polyamine. In other embodiments, the amine crosslinker is selected from the group consisting of ethylene diamine; 1,2- and 1,3-propylene diamine; 1,4-diaminobutane; 2,2-dimethylpropane diamine-(1,3); 1,6-diaminohexane; 2,5-dimethylhexane diamine-(2,5); 2,2,4-trimethylhexane diamine-(1,6); 1,8-diaminooctane; 1,10-diaminodecane; 1,11-undecane diamine; 1,12-dodecane diamine; 1-methyl-4-(aminoisopropyl)-cyclohexylamine-1; 3-aminomethyl-3,5,5-trimethylcyclohexylamine-(1); 1,2-bis-(aminomethyl)-cyclobutane; p-xylylene diamine; 1,2- and 1,4-diaminocyclohexane; 1,2-; 1,4-; 1,5- and 1,8-diaminodecalin; 1-methyl-4-aminoisopropyl-cyclohexylamine-1; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, dianisidine; 2,4-toluenediamine, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminiophenyl)sulfone; diaminodiphenylsulfone; 4-chloro-o-phenylenediamine; m-aminobenzylamine; m-phenylenediamine: 4,4'-C1-C6-dianiline such as 4,4'-methylenedianiline; aniline-formaldehyde resin; and trimethylene glycol di-p-aminobenzoate and mixtures thereof.

In further embodiments, the amine crosslinker is selected from the group consisting of bis-(2-aminoethyl)-amine, bis-(3-aminopropyl)-amine, bis-(4-aminobutyl)-amine and bis-(6-aminohexyl)-amine, and isomeric, mixtures of dipropylene triamine and dibutylene triamine. In yet further embodiments, the amine crosslinker is selected from the group consisting of diethanolamine, triethanolamine, N,N,N',N'-[tetrakis(2-hydroxyethyl)ethylene diamine], N,N,-diethanolaniline hexamethylene diamine, tetramethylene diamine, and dodecane diamine and mixtures thereof.

In other embodiments, the covalent crosslinker is a polyol crosslinker. In further embodiments, the polyol crosslinker is selected from the group consisting of polyether-polyols, polyester-polyols, branched derivatives of polyether-polyols (derived from, e.g., glycerin, sorbitol, xylitol, mannitol, glucosides, 1,3,5-trihydroxybenzene), branched derivatives of polyether-polyols (derived from, e.g., glycerin, sorbitol, mannitol, glucosides, 1,3,5-trihydroxybenzene), orthophthalate-based polyols, ethylene glycol-based polyols, diethylene glycol-based aromatic and aliphatic polyester-polyols. In further embodiments, the polyol crosslinker is selected from the group consisting of 1,2-propanediol, 1,3-propanediol. In other embodiments, the polyol crosslinker is selected from the group consisting of polycaprolactone diol, poly propylene glycol), poly(ethylene glycol), poly(tetramethylene glycol), and polybutadiene diol and their derivatives or copolymers.

Softener Oil

The gel compositions disclosed and made by methods disclosed herein may comprise at least one softener oil composition. In particular, the gel may include a softener oil comprising greater than 50 wt %, 60 wt %, 70 wt %, or 80 wt %, and less than 99 wt %, 95 wt %, 90 wt %, or 85 wt % of the base composition. In other embodiments, the softener oil is between about 51-99 wt %, about 60-95 wt %, or about 80-95 wt % of the base composition.

In certain embodiments, the softener oil is selected from the group consisting of: mineral oils, paraffin oil, naphthenic oil, aromatic oils, poly-alpha olefins (PAOs), or combinations thereof. In some embodiments, the softener oil is a mineral oil. In one particular embodiment, the softener oil is a white mineral oil, such as HYDROBRITE 380 PO (Sonneborn). In other embodiments, the mineral oil is an epoxidized mineral oil.

In yet another embodiment, the softener oil is a paraffin oil. In other embodiments, the softener oil is a naphthenic oil. In yet other embodiments, the softener oil is an aromatic oil.

In some embodiments, the softener oil is a poly-alpha olefin (PAO) or a linear-alpha olefin. PAOs may comprise hydrogenated synthetic hydrocarbon fluids used in a large number of automotive, electrical, and other industrial applications. DURASYN poly-alpha olefins are authorized for use as components of non-food articles and are considered non-toxic. In some embodiments, the PAO is a SYNFLUID® PAO, for example, a decene dimer, or a polydecene. DURASYN® 148 poly-alpha olefin is a fully synthesized hydrogenated hydrocarbon base fluid produced from C12 linear alpha olefin feed stocks and available from INEOS Oligomers, Houston, Tex. In other embodiments, the PAO is selected from the group consisting of polypropylene, polybutene (e.g., polyisobutylene), didecene, polydecene, or combinations thereof.

In certain embodiments, the softener oil is a high molecular weight oil having a molecular weight greater than about 250 g/mol. In some embodiments, the high molecular weight oil has a molecular weight greater than 250 g/mol, 400 g/mol, or 500 g/mol, and less than 2000 g/mol, 1500 g/mol, 1200 g/mol, 1000 g/mol, 900 g/mol, 800 g/mol, 700 g/mol or 600 g/mol. In some embodiments, the high molecular weight oil has a molecular weight between 250 g/mol and 1500 g/mol, between 400 g/mol and 900 g/mol, or between 500 g/mol and 800 g/mol.

The high molecular weight oil may be derived from any of the softener oil compositions defined above, such as the mineral oils, paraffin oil, naphthenic oil, aromatic oils, poly-alpha olefins (PAOs), or combinations thereof. The use of a high molecular weight oil may have perceived disadvantages for use in the thermoplastic gel composition such as (1) lower solubility of the base polymer in the oil, (2) higher bleed oil, or (3) increased melt viscosity. Nonetheless, the potential negative properties of the high molecular weight oil may be offset by adjusting the amount of base polymer content (e.g., diblock), mineral filler content, and/or anti-tack agent content in the overall gel composition.

Fillers, Anti-Tack Agents, Stabilizers and Additional Additives

In certain embodiments, the thermoplastic gel composition may comprise additional components. In one embodiment, the thermoplastic gel composition comprises at least one mineral filler. In another embodiment, the gel composition comprises an anti-tack or slip agent. In other embodiments, the gel composition may include other additives such as flame retardants, coloring agents, adhesion promoters, antioxidants, dispersants, flow improvers, plasticizers, toughening agents, and combinations thereof.

Mineral Fillers

In one embodiment, the at least one additive is a mineral filler, wherein the filler is between about 0.1-50 wt % of the overall composition, about 5-40 wt % of the overall gel composition, or about 15-30 wt % of the overall composition.

It has been discovered that use or blending of mineral fillers in thermoplastic gel compositions may improve moldability of the gel with reduced tackiness and improved thermal conductivity, while maintaining or even improving suitable sealing characteristics (e.g., low oil bleed out). It was also discovered that addition of a mineral filler may reduce the gel composition's melt viscosity while maintain the gel's hardness characteristics (as the base polymer/ thermoplastic rubber content can be decreased). Addition of the mineral filler may also reduce the material cost for the overall gel composition.

In certain embodiments, the mineral filler is selected from the group consisting of: talc, calcium carbonate, clay (e.g. Kaolin clay), wollastonite, silicates, glass (e.g., fiber, balls, hollow spheres), and combinations thereof. In one particular example, the mineral filler is a talc. Such as a Luzenac available from Imerys. Talc may be blended with the base composition as opposed to applying it just to the surface of the composition.

Anti-Tack Agents

In certain embodiments, the gel composition comprises an anti-tack or slip agent. Such anti-tack agents may be added to the base polymer to reduce the gel composition's tackiness or even achieve a certain level of surface lubrication. In some embodiments, polyethylene or polypropylene may be used as the anti-tack agent. In other embodiments, the anti-tack agent is a silicone, silane, or siloxane compound, or a copolymer thereof, such as an organo-modified siloxane. It has been discovered that use of certain anti-tack agents (such as silicone, silane, or siloxane compounds) will allow for an increased amount of base polymer (e.g., diblock) in the overall gel composition, which may provide improved oil retention of the gel. In other words, the use of certain anti-tack agents may provide improved oil retention and tackiness characteristics while maintaining other gel characteristics. In some embodiments, the anti-tack agent is between about 0.1 and 10 wt % of the overall composition, and in other embodiments between about 0.2 and 5 wt % of the overall composition. Tack reducing agents that seem to be most effective are those that are insoluble in the hydrocarbon extender oil such as silicone oligomers based on polydimethyl siloxane or phenyl methyl polysiloxane.

Stabilizers

The gel compositions disclosed and made by methods disclosed herein may comprise at least one stabilizer. In particular, the gel may include a stabilizer comprising between about 0.1-5 wt % or about 0.5-3 wt %, of the overall composition.

In some embodiments, the stabilizer is selected from the group consisting of antioxidants, acid-scavengers, light and UV absorbers/stabilizers, heat stabilizers, metal deactivators, free radical scavengers, carbon black, antifungal agents, and mixtures thereof. The stabilizer may be selected from the group consisting of: hindered phenols (e.g., Irganox™ 1076, commercially available from Ciba-Geigy Corp., Tarrytown, N.Y.); phosphites (e.g., Irgafos™ 168, commercially available from Ciba-Geigy Corp.); metal deactivators (e.g., Irganox™ D1024, commercially available from Ciba-Geigy Corp.); sulfides (e.g., Cyanox LTDP, commercially available from American Cyanamid Co., Wayne, N.J.); light stabilizers (e.g., Cyasorb UV-531, commercially available from American Cyanamid Co.); phosphorous containing organic compounds (e.g., Fyrol PCF and Phosflex 390, both commercially available from Akzo Nobel Chemicals Inc. of Dobbs Ferry, N.Y.); acid scavengers (e.g., DHT-4A, commercially available from Kyowa Chemical industry Co. Ltd through Mitsui & Co. of Cleveland, Ohio, and hydrotalcite); and mixtures thereof.

In certain embodiments, the gel composition comprises at least one stabilizer. In particular, the gel may include a stabilizer comprising between about 0.1-5 wt %, about 0.5-3 wt %, or about 1-2 wt % of the overall composition.

In some embodiments, the stabilizer is selected from the group consisting of antioxidants, acid-scavengers, light and UV absorbers/stabilizers, heat stabilizers, metal deactivators, free radical scavengers, carbon black, antifungal agents, and mixtures thereof. In some embodiments, the stabilizer is a hindered phenolic antioxidant. The stabilizer may be selected from the group consisting of: hindered phenols (e.g., Irganox™ 1076, commercially available from Ciba-Geigy Corp., Tarrytown, N.Y.); phosphites (e.g., Irgafos™ 168, commercially available from Ciba-Geigy Corp.); metal deactivators (e.g., Irganox™ D1024, commercially available from Ciba-Geigy Corp.); sulfides (e.g., Cyanox LTDP, commercially available from American Cyanamid Co., Vayne, N.Y.); light stabilizers (e.g., Cyasorb UV-531, commercially available from American Cyanamid Co.); phosphorous containing organic compounds (e.g., Fyrol PCF and Phosflex 390, both commercially available from Akzo Nobel Chemicals Inc. of Dobbs Ferry, N.Y.); acid scavengers (e.g., DHT-4A, commercially available from Kyowa Chemical Industry Co. Ltd through Mitsui & Co. of Cleveland, Ohio, and hydrotalcite); and mixtures thereof.

Additional Additives

In another embodiment, the gel comprises a toughening agent that may improve the ability for the composition to deform without breaking. In some embodiments, the toughening agent may allow the composition to be strained to approximately 800%, 1,000%, or 1,200% of its original size before breaking. In certain embodiments, the toughening agent is a fumed silica. In certain embodiments, the fumed silica is between about 0.1-30 wt % of the overall composition, about 1-25 wt % of the overall composition, or about 5-20 wt % of the overall composition. One non-limiting example of a fumed silica that may be used in the gel composition is AEROSIL® R9200 modified, hydrophobic fumed silica, available from Evonik Degussa Corp. (Parsippany, N.J., USA).

In some embodiments, the compositions disclosed and made by methods disclosed herein comprise a flame retardant. The flame retardant may be a halogenated paraffin (e.g., Bromoklor 50, commercially available from Ferro Corp., Hammond, Ind.), a metal hydride, calcium carbonate, zinc oxide, or a siloxane (such as Casico™, available from Borealis AG, Vienna, Austria). In some embodiments, the flame retardant is between about 0.1 and 25 wt % of the overall composition, between about 0.1 and 5 wt % of the overall composition, between about 0.1 and 2 wt % of the overall composition, or between about 0.1 and 1 wt % of the overall composition. In one embodiment, the flame retardant comprises about 20 wt % of the overall gel composition.

Other suitable additives include colorants, biocides, tackifiers, and the like, described in "Additives for Plastics, Edition 1" published by D.A.T.A., Inc. and The international Plastics Selector, Inc., San Diego, Calif.

In certain embodiments, the additional additives may include at least one material selected from the group consisting of Dynasylan 40, PDM 1922, Songnox 1024, Kingnox 76, DHT-4A, Kingsorh, pigment, and mixtures thereof. In some embodiments, the additives comprise between about 0.1 and 25 wt % of the overall composition, between about 0.1 and 5 wt % of the overall composition, between about 0.1 and 2 wt % of the overall composition, or between about 0.1 and 1 wt % of the overall composition.

Uses and Properties of the Thermoplastic Gel, and Testing Methods

The gels described herein may be used in a number of end uses due to their improved properties, such as improved behavior in mechanical stresses (e.g., vibration and shock) or ability to seal uneven or complicated structures (due to the ability to flow and adapt to the area of the structure). In certain embodiments, the gel may be used in an interconnect, cover, or closure system. In particular, the gel may be used in a fiber optic closure, electrical sealant, or electrical closure. In some embodiments, the gels are used as gel wraps, clamshells, or gel caps. In further embodiments, the gels are used in the inside of a residence, in other embodiments, the gels are used outside of a residence. Use of the gel within a closure or interconnect system may allow for a reduction in the number of components, frame size, or cost over other sealing mechanisms.

With regards to use as a sealant, the gels described herein tend to exhibit a unique stress-strain dynamic, as further described below. With an increase in strain beyond the point of the elastic (linear) portion of the curve, the gel exhibits a somewhat exponential increase in stress prior to the failure point. In other words, the gel tends to become even stiffer with an increase in strain or pressure on the gel as it approaches its failure point. In certain examples, such as within a closure, the gel is stiff at the higher strain points near the ends of the closure, keeping the softer gel composition within the closure from extruding out of the closure.

In certain embodiments, the gel is used as a dampener. In certain embodiments, the gel is used as a flame retardant sealant. In one embodiment, the gel comprises a flame retardant additive (e.g., zinc oxide) in order to function as a flame retardant sealant.

In certain embodiments, the gel is used in a closure or enclosure system. In certain embodiments, the closure system comprises a housing, a cable, and a gel.

In some embodiments, a closure, enclosure or interconnect system is provided comprising a housing, a cable, and a thermoplastic gel comprising a base composition consisting of a thermoplastic rubber and a softener oil; and at least one additive selected from the group consisting of a mineral filler, an anti-tack agent, and mixtures thereof, wherein the base composition and at least one additive define an overall composition, and wherein the gel has a hardness between 15 Shore 000 and 65 Shore 000.

In some embodiments, a closure, enclosure or interconnect system is provided comprising a housing, a cable, and a thermoplastic gel comprising a base composition consisting of a thermoplastic rubber and a softener oil, wherein the softener oil is a high molecular weight oil having a molecular weight greater than 250 g/mol, and wherein the gel has a hardness between 15 Shore 000 and 65 Shore 000.

In some embodiments, the system further comprises a connector, and, in some instances, a receptacle or port, therein forming an interconnect system. The interconnect system may comprise a mini input/output connector, data connector, power connector, fiber optic connector, or combination thereof. For example, the interconnect system may comprise a RJ-45 connector system. Non-limiting examples of interconnect systems and components are displayed in FIGS. 1, 2, 3, 4a, 4b, 5a, and 5b.

The gel may be used to create a seal formed by displacement. In other embodiments, the gel may be used to create a seal having radial functionality, axial functionality, or a combination thereof. In yet other embodiments, the gel may be used to create a seal formed by displacement and having radial and/or axial functionality.

Figure 2:
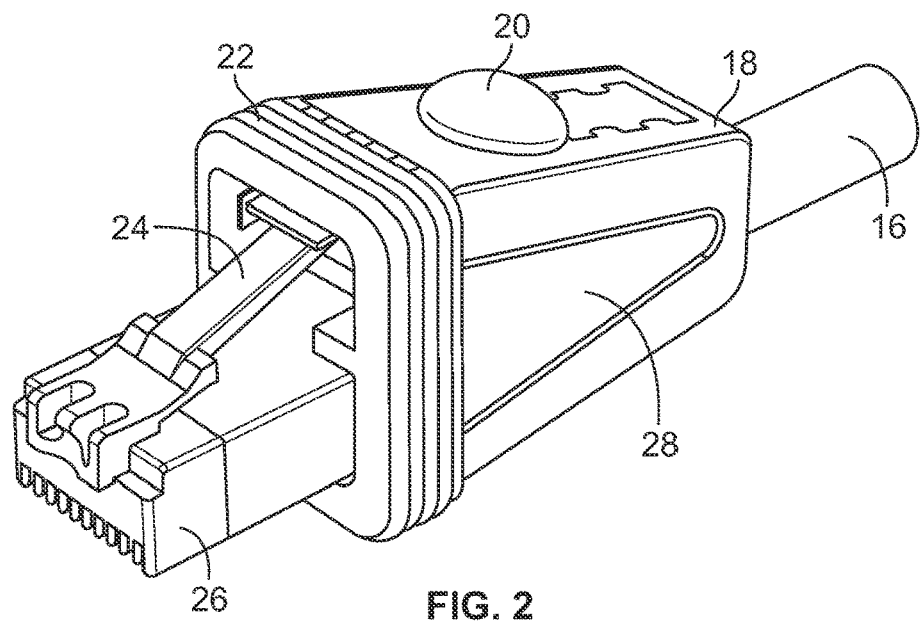
FIG. 2 is a depiction of a connector, housing, and cable assembly with radial sealing.
Figure 3:
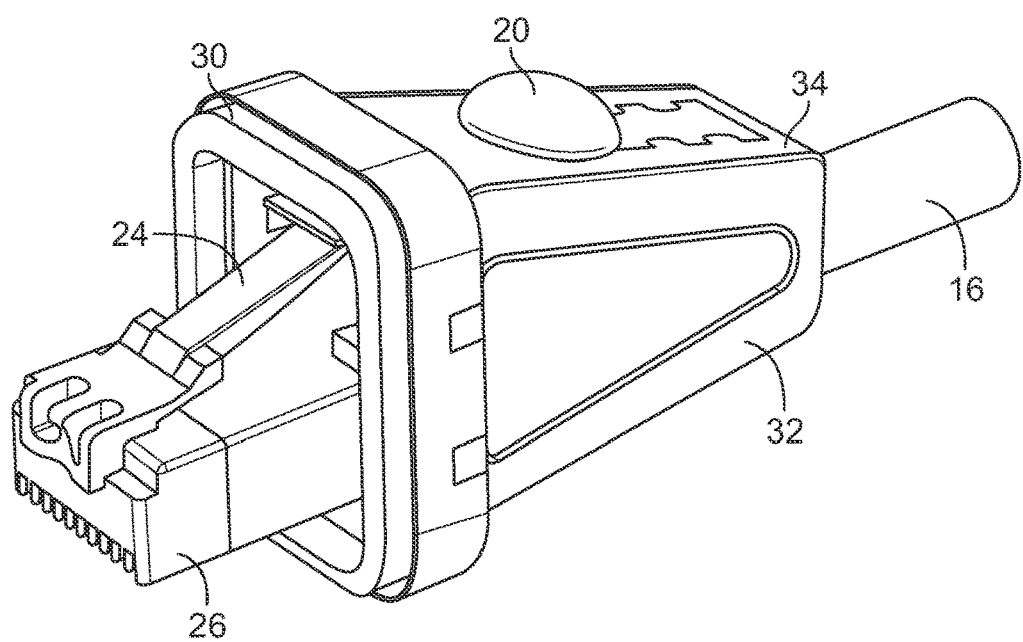
FIG. 3 is a depiction of a connector, housing, and cable assembly with axial sealing.

FIGS. 1, 2, and 3 provide non-limiting examples of radial and axial functionality. FIG. 1 displays an example of a connection hub having multiple connection receptacles or ports for the cables 16 within the housings 14 to be connected. FIG. 1 displays both radial connection ports 10 and axial connection ports 12. FIG. 2 displays a connector 26; housing 18, 28; and cable 16 assembly with radial sealing 22. FIG. 3 displays a connector 26; housing 32, 34; and cable 16 assembly with axial sealing 30, wherein the seal follows the surface of the axial port 12 (as shown in FIG. 1). In certain embodiments, the housing may have a knob 20 that may be pushed inward to engage the latch 24 on the connector 26, allowing the connector to be removed from the port.

In certain embodiments, the gel may be used to create a seal in a housing assembly having multiple parts. For example, in one embodiment the gel may be used in a straight two-piece housing assembly, as shown in FIGS. 4a and 4b. Similar to FIG. 3, FIGS. 4a and 4b display a two-piece housing 32, 34, having axial sealing 30, wherein the seal follows the surface of the axial port 12 (as shown in FIG. 1). In certain embodiments, the housing may have a knob 20 that may be pushed inward to engage the latch 24 (as shown in FIG. 3) on the connector 26 (as shown in FIG. 3), allowing the connector to be removed from the port.

In another embodiment, the gel may be used in an angled two-piece housing assembly, as shown in FIGS. 5a and 5b. FIGS. 5a and 5b display a connector 26; angled two-piece housing 36, 38; and cable 16 assembly with axial sealing 30, wherein the seal follows the surface of the axial port 12 (as shown in FIG. 1). In certain embodiments, the housing may have a knob 20 that may be pushed inward to engage the latch 24 on the connector 26, allowing the connector to be removed from the port.

The gel may be sealed around the cable 16 by sliding a smaller diameter gel formation over the cable to create a seal through interference. In other embodiments, the seal may be created by molding the gel around the inside of the housing components and then snapping the housing, gel, and cable into place.

In certain embodiments, the gel is used as a sealant in a telecommunications enclosure. Non-limiting examples of telecommunications enclosures are shown in FIGS. 6-10.

Figure 6:
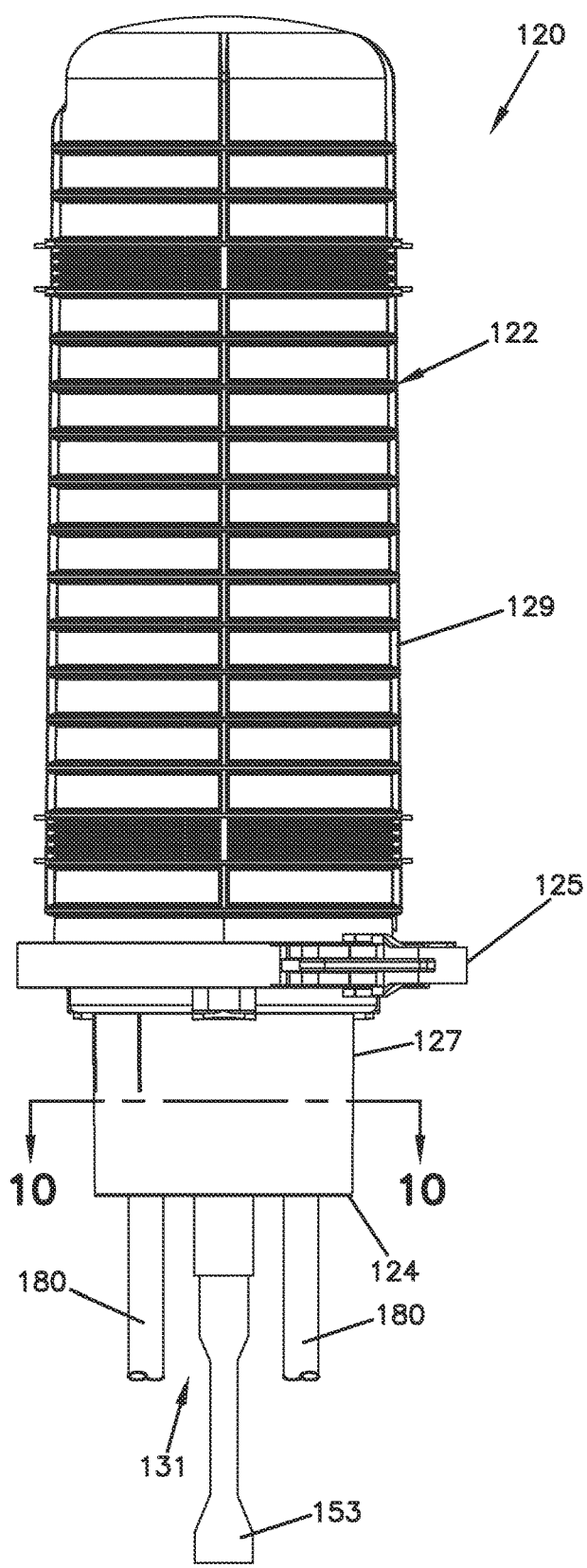
FIG. 6 is a side view of a telecommunications enclosure suitable for using a sealant in accordance with the principles of the present disclosure.
Figure 7:
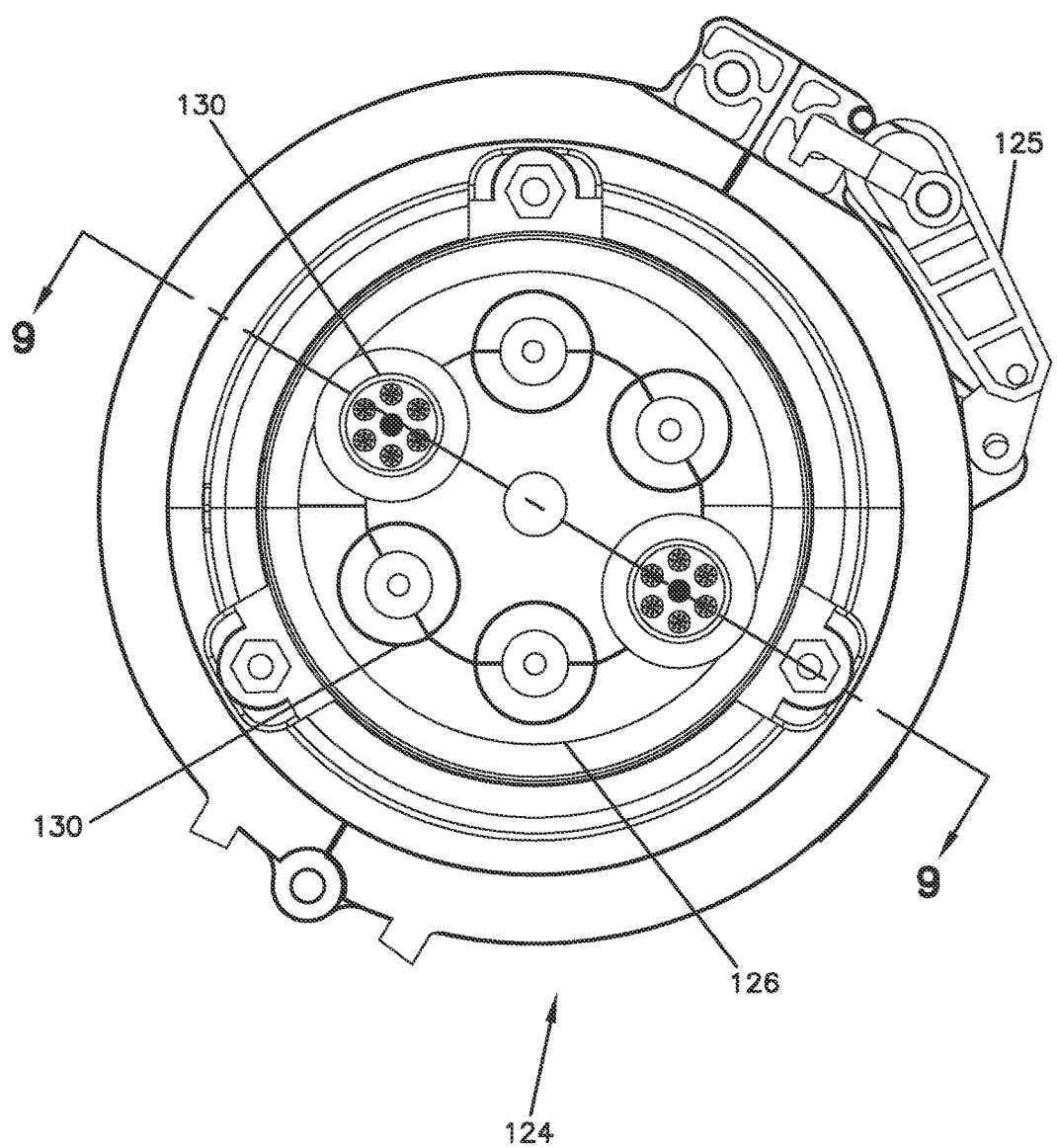
FIG. 7 is an end view of the telecommunications enclosure of FIG. 6.
Figure 8:
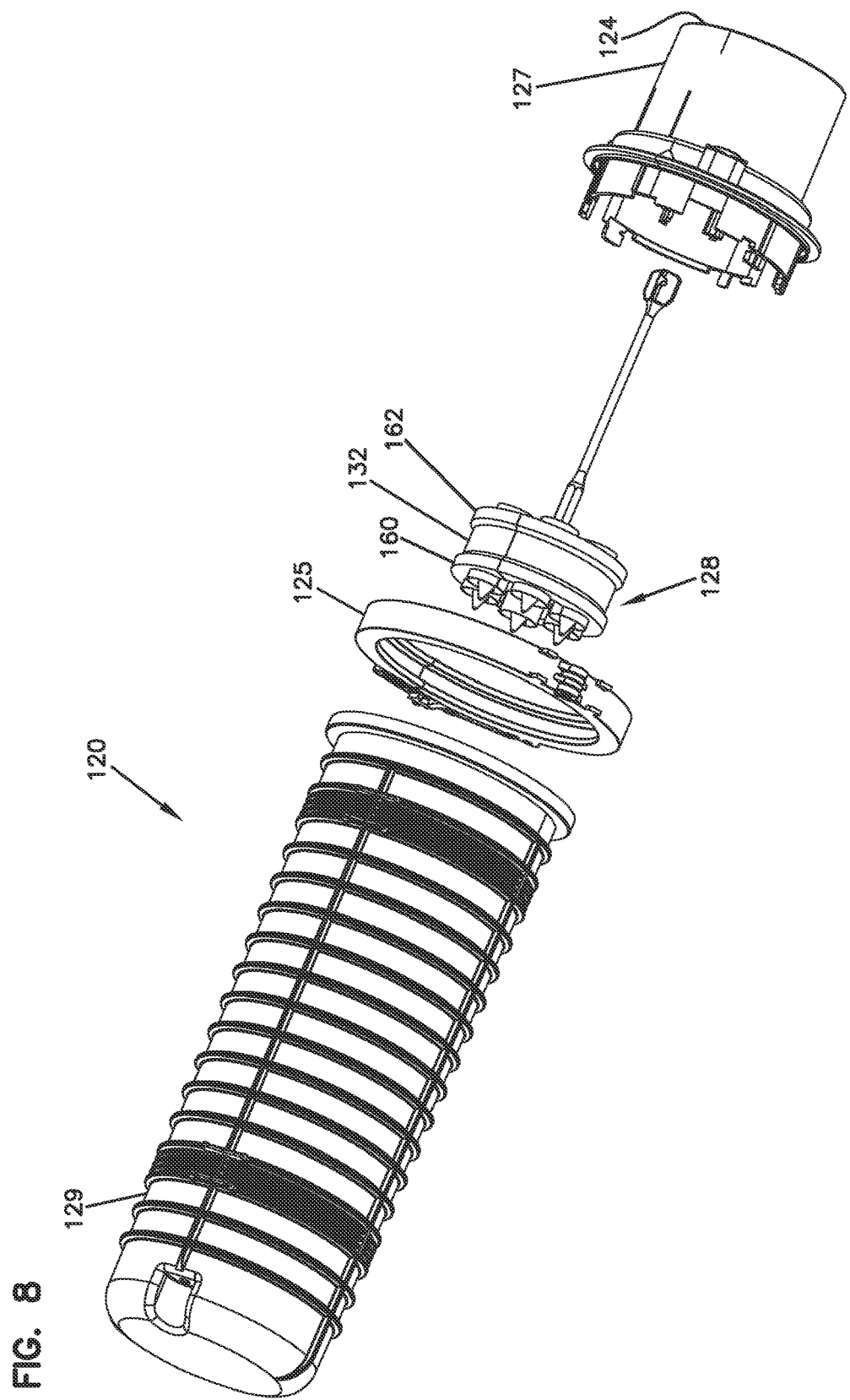
FIG. 8 is an exploded view of the telecommunications enclosure of FIG. 6.

FIGS. 6-8 show a telecommunications enclosure 120 suitable for using a sealing material in accordance with the principles of the present disclosure. The enclosure 120 includes a housing 122 having an end 124 defining a sealing unit opening 126. The sealing unit opening 126 is defined by a base 127 of the enclosure 120. The base 127 has a hollow sleeve-like configuration. As shown in FIGS. 6 and 8, a dome-style cover 129 is secured to the base 127 by a channel clamp 125. The enclosure 120 also includes a sealing unit 128 (see FIGS. 8-10) that fits within the sealing unit opening 126. The sealing unit 128 includes a sealant arrangement 132 (see FIGS. 9 and 10) defining a plurality of cable ports 130. The sealant arrangement can include a material having stress-strain characteristics in accordance with the principles of the present disclosure. In certain embodiments, the sealant arrangement can include a gel of the type disclosed herein. When pressurized, the sealant arrangement 132 is configured for providing seals about structures (e.g., cables, plugs, etc.) routed though the cable ports 130 and is also configured for providing a peripheral seal with the housing 122. The enclosure 120 further includes an actuation arrangement 131 (see FIG. 9) for pressurizing the sealant arrangement 132 within the sealing unit opening 126. In other embodiments, the housing can be an enclosure (e.g., an aerial enclosure) having a pass-through configuration with sealing units located at opposite ends of the enclosure. In certain embodiments, a frame supporting optical components (e.g., optical splices, optical splitters, optical splice trays, optical splitter trays, fiber management trays, passive optical splitters, wavelength division multi-plexers, etc,) can be mounted within the enclosure 120.

Figure 9:
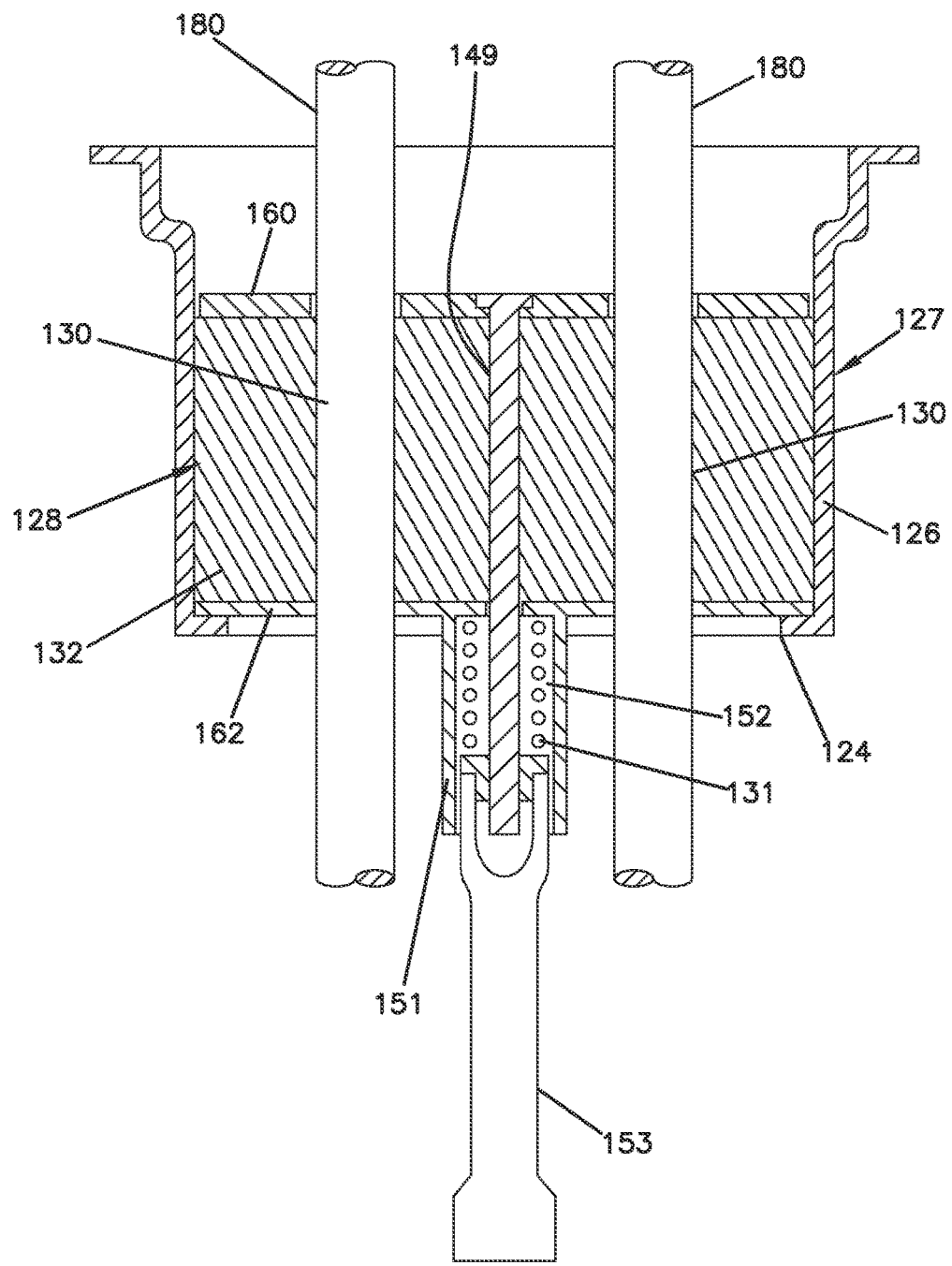
FIG. 9 is a cross-sectional view taken along section line 9-9 of FIG. 7.

Referring to FIG. 9, the actuation arrangement 131 includes inner and outer pressurization structures 160, 162 (e.g., plates, members, bodies, etc.). The sealant arrangement 132 is positioned between the inner and outer pressurization structures 160, 162. The actuation arrangement 131 also includes a threaded shaft 149 that extends between the inner and outer pressurization structures 160, 162 and a nut 151 that is threaded on the threaded shaft 149. The actuation arrangement further includes a spring 152 for transferring a seal pressurization force to the sealant arrangement 132. The spring 152 is captured between the nut 151 and the outer pressurization structure 162. An extension 153 (e.g., a wrench or other tool) is used to turn the nut 151a first rotational direction (e.g., clockwise) on the threaded shaft 149 causing the spring 152 to be compressed between the nut 151 and the outer pressurization structure. As the spring 152 is compressed, the threaded shaft 149 is tensioned and the inner and outer pressurization structures 160, 162 are drawn together. As the inner and outer pressurizations structures 160, 162 are drawn together, the sealant arrangement 132 is pressurized between the pressurization structures 160, 162 causing the sealant arrangement 132 to flow/deform to fill voids within the sealing unit opening 126, to form the peripheral seal with the housing 122, and to form seals around any cables or inserts positioned within cable ports 130. Thus, when the actuation arrangement 131 is actuated, the first and second pressurization plates 60, 62 are spring biased toward one another such that spring pressure is applied through the sealant arrangement 132 for pressurizing the sealant arrangement 132 to maintain effective sealing over an extended period of time. In other embodiments, different actuation configurations can be used. The sealant arrangement 132 can be de-pressurized by turning the nut 151a second rotational direction (e.g., counterclockwise) on the shaft 149 to decompress the spring 152.

Figure 10:
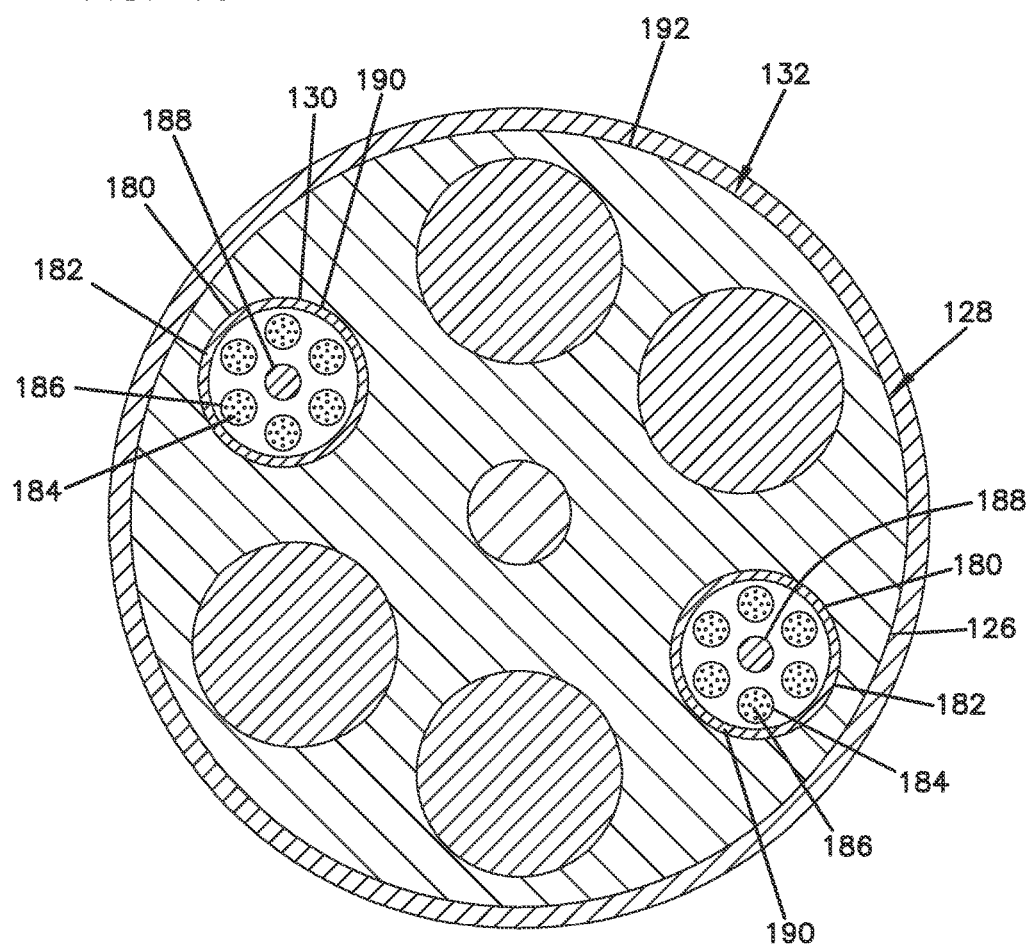
FIG. 10 is a cross-sectional view taken along section line 10-10 of FIG. 6.

Referring to FIGS. 9 and 10, two cables 180 are shown passing through the cable ports 130 while the remainder of the cable ports 130 are shown blocked with plugs. The cables 180 include outer jackets 182 containing a plurality of buffer tubes 184. A plurality of optical fibers 186 are contained in each of the buffer tubes 184. The cables 180 also include center strength members 188 (e.g., fiberglass reinforced epoxy rods) that provide the cables with tensile and compressive reinforcement. In other embodiments, reinforcing members in the form aramid yarns or other reinforcing structures can be used. In certain embodiments, the cables 180 can be LSZH cables. When pressurized, the sealant arrangement 132 contacts the outer jackets 182 and forms cable seals 190 around peripheries of the cable jackets 182. When pressurized, the sealant arrangement 132 also contacts an interior of the base 127 to form a peripheral seal 192 with the base 127. Cables having alternative constructions (e.g., flat drop cables, cables without buffer tubes, cables without center strength members, etc.) can also be used.

In certain embodiments, the gel has measurable properties. Gel properties may be measured under the International Telecommunication Union standardization sector (ITU-T), and Series L.13, in particular, Various properties such as pressure loss, tightness, visual appearance, etc. are discussed in this standard.

Additionally, the gel may have a hardness in the range of about 15 to about 65 Shore 000 Hardness, as measured according to methods known in the art. In certain embodiments, the gel exhibits a hardness in the range of 30 to 45 Shore 000 Hardness. In certain embodiments, the shore hardness gauge is measured according to ISO868 or ASTM D2240. In other embodiments, hardness can be measured on a texture analyzer. For example, a LFRA. Texture Analyzer-Brookfield may include a probe assembly fixed to a motor driven, bi-directional load cell. In such a system, the probe is driven vertically into the sample at a pre-set speed and to a pre-set depth. The hardness is the amount of force needed to push the probe into the test sample. In other embodiments, the gel has a hardness in the range of about 24 to about 53 Shore 000, or about 80 to about 300 g. In yet other embodiments, the gel has a hardness in the range of about 37 to about 45 Shore 000, or about 160 to about 220 g. In yet other embodiments, the gel has a hardness in the range of about 38 to about 42 Shore 000, or about 170 to about 200 g. In other embodiments, the gel has a hardness in the range of 32 to 41 Shore 000. In yet other embodiments, the gel has a hardness in the range of 37 to 42 Shore 000.

In some embodiments, stress relaxation of the gel is determined. The gel is compressed with a certain strain or deformation (e.g., in certain embodiments, to 50% of its original size). This causes a certain stress in the material. The stress is now reduced because the material relaxes. In certain embodiments, the stress relaxation of the gel has a possible range between 12 and 35% when subjected to a tensile strain or deformation of about 50% of the gel's original size, wherein the stress relaxation is measured after a one minute hold time at 50% strain. In other embodiments, the stress relaxation of the gel is between 20% and 30% when subjected to a tensile strain of about 50%. A higher stress relaxation indicates that once a gel is installed in a closure, the gel will require less stress in order for it to seal.

In certain embodiments, the gel composition is used to prepare a thermoplastic gel exhibiting less than about 10% bleed out over a period of time when the gel is under compression of 50 kPa (0.5 atm) or 120 kPa (1.2 atm) at 60° C. In some embodiments, the gel exhibits less than about 15% oil bleed out over a period of time when the gel is under compression of 120 kPa (1.2 atm) at 70° C. The weight of the gel sample is recorded before and after the pressure has been applied. In certain embodiments, oil bleed out is measured on a wire mesh, wherein the oil loss may exit the gel through the mesh. Typically, gel samples should be about 3 mm±0.5 mm thick and have a diameter of about 14 mm±0.5 mm, and three samples should be tested from each gel. The gel sample is placed into a cylindrical hole/tube resting on a fine and rough screen, which gives enough support to hold the gel but in the meantime allows the oil to separate from the gel. Pressure is applied to the gel by placing a weight on top of a piston (which prevents the gel from creeping out of the hole). Typically, approximately 50 kPa (0.5 atm) or 120 kPa (1.2 atm) of pressure is placed on the gel sample. Then, the sample is placed in an oven at about 60° C. After about 24 hours, the sample is removed from the oven to clean the surface oil and weigh the gel. The sample is then returned to the oven. Weight measurements are taken every 24 hours until stabilization has occurred (e.g., when 5 weight measurements are constant).

In some embodiments, the gel has less than 8%, 6%, 4%, or 2% oil bleed out over the period of time. In certain embodiments, the oil loss is measured at 200 hours, 400 hours, 600 hours, 800 hours, 1,000 hours, 1,200 hours, or 1,440 hours (60 days).

In certain embodiments, the gel has less oil bleed out in comparison to a thermoplastic gel over the same period of time at 50 kPa (0.5 atm) or 120 kPa (1.2 atm) at 60° C. In some embodiments, the gel has less than 20%, 30%, 40%, 50%, or 60% of the oil bleed out of a similar, traditional thermoplastic gel at 200 hours, 400 hours, 600 hours, 800 hours, 1,000 hours, 1,200 hours, 1,440 hours (60 days), 2,000 hours, or 3,000 hours.

In certain embodiments, the thermoplastic gel has less oil bleed out in comparison to a conventinal thermoplastic gel over the same period of time at 50 kPa (0.5 atm) or 120 kPa (1.2 atm) at 70° C. In some embodiments, the gel has less than 20%, 30%, 40%, 50%, or 60% of the oil bleed out of a similar, traditional thermoplastic gel at 200 hours, 400 hours, 600 hours, 800 hours, 1,000 hours, 1,200 hours, 1,440 hours (60 days), 2,000 hours, or 3,000 hours.

In some embodiments, the thermoplastic gel exhibits one or more of the following properties: a) a Shore 000 hardness between 30 and 45; b) a stress relaxation between 10% and 35% when the gel is subjected to a deformation of 50% of its original size; c) less than 20% oil bleed out after being under compression of 1.2 atm for 60 days at 70° C.

EXAMPLES

A variety of thermoplastic gels were made and tested as discussed below.

Example 1—High Molecular Weight Softener Oil

A thermoplastic gel was made using the following formula of Table 1.

TABLE 1

| Thermoplastic gel formulation. | |
|---|---|
| Component | Weight Percent |
| Functionalized extender | 40.0-90.0 |
| Synthetic hydrocarbon base fluid | 0-40.0 |
| Polydimethyl siloxane fluid | 0-3.5 |
| Hindered phenol stabilizer | 0.2-1.5 |
| Maleated SEBS, maximum functionality 1.15% by weight | 5.0-20.0 |
| Maleated SEBS, maximum functionality 2.0% by weight | 0-8.0 |
| Fumed silica | 0-5.0 |
| Metal Acetyl Acetonate | 0.5-2.5 |

400 g of above composition was blended in a laboratory planetary mixer for 30 minutes at 210° C. The metal acetyl acetonate may be aluminum acetyl acetonate, zinc acetyl acetonate, iron acetyl acetonate, or any other acetyl acetonate, such as chromium acetyl acetonate, zirconium acetyl acetonate, and any combination of acetyl acetonates. The resulting mixture when cooled formed a gel material.

Test samples of the mixture were prepared using a hot press by placing 40 g of the mixture in a 3 mm thick by 200 mm square picture frame mold for 10 minutes at 10,000 Newtons of force. The plaque formed was used to determine the following properties. The hardness of the gel was approximately 120 g using a 6.35 mm semispherical probe inserted to a depth of 4 mm in a 30 mm thick s gel sample at a rate of 2 mm/min. The one minute stress relaxation value was 26%. The mechanical properties were average elongation to failure of 1,300%, and stress to failure of 0.95 MPa measured on rings of 25 mm diameter, 3 mm thick×4 mm wide using a universal test machine.

Example 2—Talc Filler

A thermoplastic gel was made using the formula according to Table 2:

TABLE 2

| Thermoplastic gel formulation with talc filler | |
|---|---|
| Component | Weight Percent |
| Synthetic hydrocarbon base fluid | 40.0-88.0 |
| Hindered phenolic antioxidant | 0.2-1.5 |
| UV absorber | 0.1-0.75 |
| Hydrocarbon resin | 0-15.0 |
| SEBS triblock copolymer | 4.0-20.0 |
| SEP diblock copolymer | 3.0-10.0 |
| Talc | 5.0-30.0 |

400 g of above composition was blended in a laboratory planetary mixer for 30 minutes at 210° C. The resulting mixture when cooled formed a gel material. Samples were prepared and tested as described in Example 1. The results were 65 g hardness, 28% stress relaxation, elongation to failure 1500% and strength of 0.2 MPa.

Examples 3-14—Additional Thermoplastic Gels

Additional thermoplastic gels were prepared from the compositions in Tables 3 and 4 and tested as described in Example 1.

TABLE 3

Additional Thermoplastic Gel Compositions

| Ingredient | Comparative Example 3 | Example 4 | Example 5 | Example 6 | Example 7 | Example 8 |
|---|---|---|---|---|---|---|
| Synthetic Hydrocarbon | | 30.00 | | 20.00 | 74.50 | 73.60 |
| Maleated PIB | 0.00 | 44.50 | 74.50 | 53.00 | | |
| White Mineral Oil | 77.20 | | | | | |
| Triblock copolymer | 15.00 | | | | 15.00 | 18.00 |
| Diblock copolymer | 6.00 | | 7.00 | 5.50 | 8.00 | 7.00 |
| Maleated triblock copolymer | | 19.50 | 11.50 | 15.50 | | |
| Hindered phenol stabilizer | 1.20 | 1.00 | 1.00 | 1.00 | 1.40 | 1.40 |
| UV Absorber | 0.50 | | | | | |
| Polydimethyl siloxane fluid | | 2.00 | 3.00 | 2.00 | 1.00 | |
| Fumed silica | | 2.00 | 2.00 | 2.00 | | |
| Talc | | | | | | |
| Metal acetyl acetonate | | 1.00 | 1.00 | 1.00 | | |
| Calcium Oxide | | | | | | |
| Black pigment color concentrate | | | | | | |
| UMB blue pigment | 0.10 | | | | 0.10 | 0.00 |
| TOTAL | 100.00 | 100.00 | 100.00 | 100.00 | 100.00 | 100.00 |

TABLE 4

Additional Thermoplastic Gel Compositions

| Ingredient | Example 9 | Example 10 | Example 11 | Example 12 | Example 13 | Example 14 |
|---|---|---|---|---|---|---|
| Synthetic Hydrocarbon | 68.60 | | | | | 78.60 |
| Maleated PIB | | | | | | |
| White Mineral Oil | | 55.90 | 52.90 | 74.60 | 60.20 | |
| Triblock copolymer | 20.00 | 8.00 | 8.00 | 14.70 | 11.40 | 14.00 |
| Diblock copolymer | 10.00 | 4.50 | 6.50 | 8.10 | 5.10 | 6.00 |
| Maleated triblock copolymer | | | | | | |
| Hindered phenol stabilizer | 1.40 | 1.05 | 1.05 | 1.05 | 1.20 | 1.40 |
| UV Absorber | | 0.35 | 0.35 | 0.35 | 0.40 | |
| Polydimethyl siloxane fluid | | | 1.00 | 1.00 | 1.00 | |
| Fumed silica | | | | | | |
| Talc | | 30.00 | 30.00 | | 20.00 | |
| Metal acetyl acetonate | | | | | | |
| Calcium Oxide | | | | | 0.50 | |
| Black pigment color concentrate | | 0.20 | 0.20 | 0.20 | 0.20 | |
| UMB blue pigment | 0.00 | | | | | |
| TOTAL | 100.00 | 100.00 | 100.00 | 100.00 | 100.00 | 100.00 |

Samples were prepared from the compositions of Examples 3-14 and tested as described in Example 1. Properties of thermoplastic gels of Examples 3-14 are shown in Table 5.

TABLE 5

Thermoplastic Gel Properties.

| Example | Hardness (Shore 000) | Stress relaxation (%) (60 s value) | Oil bleed out at 120 kPa, 70° C. (%, # days) | Tensile Strength (MPa) | Elongation to Break (%) |
|---|---|---|---|---|---|
| 3 | 34 | 24 | 25%, 30 days | 0.9 | 1800 |
| 4 | 43 | 24 | NT | 0.54 | 1000 |
| 5 | 44 | 28 | NT | 0.55 | 1050 |
| 6 | 41 | 30 | NT | 0.4 | 1150 |
| 7 | 32 | 21 | NT | 1.3 | 2300 |
| 8 | 35 | 23 | 8.8%, 33 days | 1 | 1600 |
| 9 | 39 | 13 | 4.1%, 26 days | 0.41 | 1400 |
| 10 | 27 | 23 | 16.8%, 62 days | 0.24 | 1000 |
| 11 | 41 | 34 | 13.7%, 62 days | 0.27 | 1100 |
| 12 | 38 | 28 | 8.4%, 62 days | 0.28 | 1400 |
| 13 | 42 | 26 | NT | 0.54 | 1580 |
| 14 | 34 | NT | 13.7%, 33 days | NT | NT |

NT = not tested

The gel samples exhibited a range of Shore 000 hardness of from 32 to 44; and a range of stress relaxation (60 s value) of from 13-28%; a tensile strength in a range from 0.41 to 1 MPa; and elongation to Break (%) in a range from 1000-2300%.

Example 3 comparative conventional thermoplastic gel example exhibited 25 wt % oil bleed out under 120 kPa at 70° C. In contrast, examples 8, 9, prepared from compositions comprising a synthetic hydrocarbon high molecular weight softener oil, each exhibited less than 10 wt % oil bleed out under 120 kPa at 70° C. over a period of at least 26 days, while retaining favorable gel properties of hardness (Shore 000), stress relaxation, tensile strength and elongation to break.

Examples 10 and 11, comprising talc, exhibited less than 20 wt %, or less than 15 wt % oil bleed out, respectively, over a period of 60 days under compression of 1.2 atm at 70° C. Examples 11 and 12, comprising anti-tack agent polydimethyl siloxane exhibited less than 15 wt % oil bleed out after 60 days under compression of 1.2 atm at 70° C. Example 12, comprising anti-tack agent polydimethyl siloxane fluid, exhibited less than 10 wt % oil bleed out after 60 days under compression of 1.2 atm at 70° C.

Example 15—Thermoplastic Gel Formulation

Thermoplastic gels were made from compositions according to Table 7.

TABLE 7

Thermoplastic Gel Formulation

| Component | Weight Percent |
|---|---|
| Softener oil | 50-80 |
| Triblock copolymer | 5-20 |
| Diblock copolymer | 3-12 |
| Hindered phenolic antioxidant | 0.2-1.5 |
| UV absorber | 0-0.75 |
| Polydimethyl siloxane fluid | 0-5 |
| Talc | 0-40 |
| Pigment | 0-1 |

Thermoplastic gels were prepared employing the formulation of Table 7. The resulting mixtures when cooled formed gel materials and were tested according to Example 1. In the composition of Table 7, when both the polydimethyl siloxane fluid and were absent, the softener oil was a high molecular weight synthetic hydrocarbon. In the presence of one or both of the polydimethyl siloxane fluid and talc, the softener oil was either synthetic hydrocarbon or white mineral oil. Samples were prepared and tested as described in Example 1. The results were hardness (Shore 000) 35-(Shore 000) 41; 13-28% stress relaxation (60 s value); elongation to break 1000%-1600%; and tensile strength of 0.24-1 MPa.

Thermoplastic gels prepared according to the Formulation of Table 7 exhibited less than 20 wt % oil bleed out, more typically less than 15 wt %, or less than 10 wt % over a testing period of at least 26 days under 120 kPa at 70° C.

Example 16—Thermoplastic Gel-Oil Bleed Out

Figure 11:
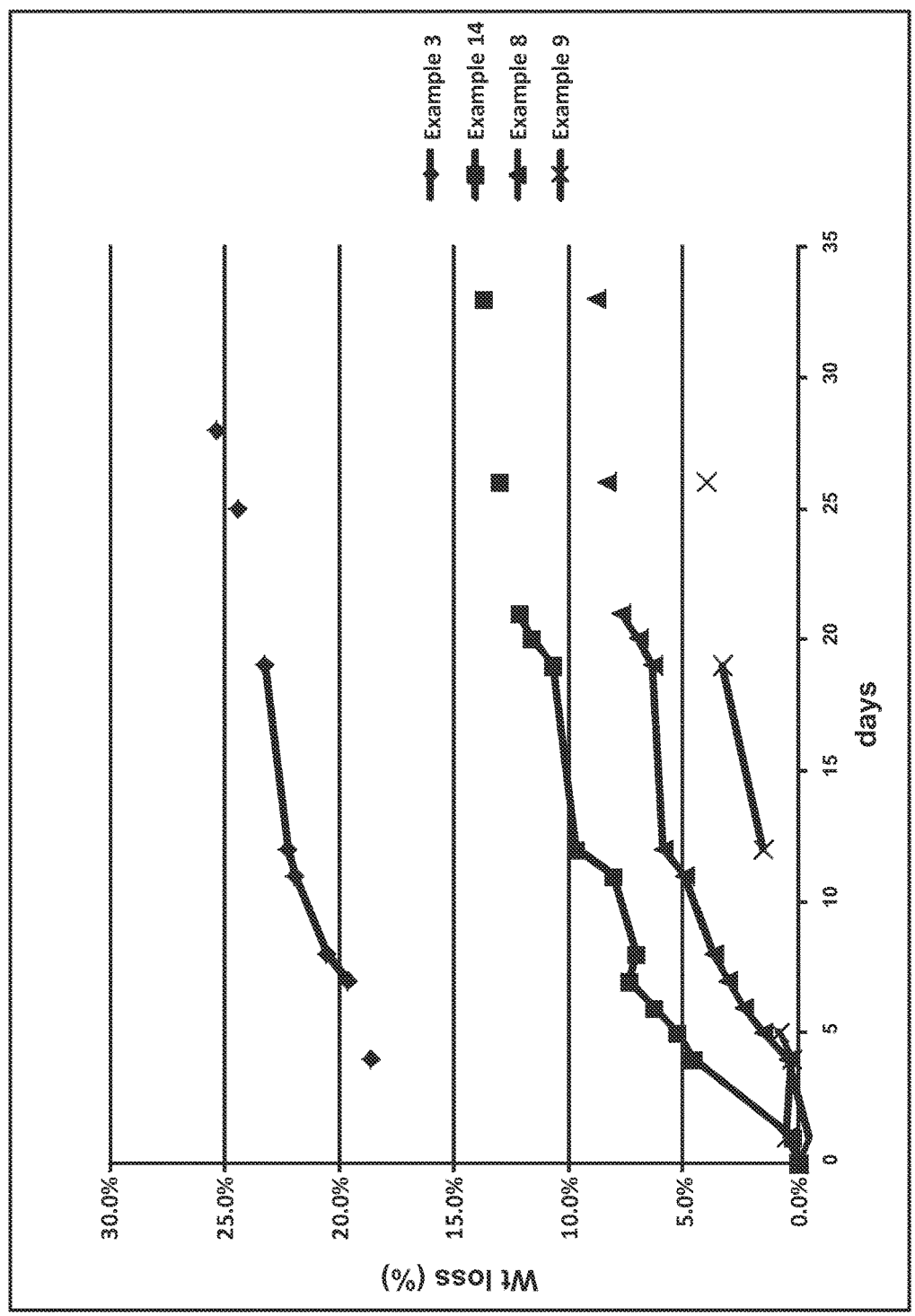
FIG. 11 is a graph of oil bleed out showing extender wt loss (%) vs. days of 120 kPa pressure at 70° C. for representative thermoplastic gel examples and a comparative gel example.

Selected thermoplastic gels of the Examples were tested over a period of 33 days for oil bleed out as follows. The weight of the gel sample was recorded before and after the pressure was been applied. Oil bleed out was measured on a wire mesh, wherein the oil loss may exit the gel through the mesh. Gel samples were prepared as described in Examples 1 and 3 to a dimension of about 3 mm±0.5 mm thick with a diameter of about 14 mm±0.5 mm, and three samples were tested from each gel. The gel sample was placed into a cylindrical hole/tube resting on a fine and rough screen, which gave enough support to hold the gel, but allowed the oil to separate from the gel. Pressure was applied to the gel by placing a weight on top of a piston (which prevents the gel from creeping out of the hole); 120 kPa (1.2 atm) of pressure was placed on the gel sample. Then, the sample is placed in an oven at about 70° C. After about a period of time, the sample is removed from the oven to clean the surface oil and weigh the gel. The sample was then returned to the oven. Weight measurements were taken at selected intervals of 0, 1, 4, 5, 6, 7, 8, 11, 12, 19, 20, 21, 25, 26, 28, and/or 33 days. Extender weight loss (%) vs. days of 120 kPa pressure at 70° C. was plotted as shown in FIG. 11. Surprisingly, the inventive thermoplastic gels of Examples 8, 9 and 14 each exhibited less than 15 wt % oil bleed out over the testing period under 120 kPa at 70° C. In contrast, the comparative thermoplastic gel of Example 3 without a mineral filler, an anti-tack agent or a high molecular weight synthetic hydrocarbon softener oil, exhibited about 25 wt % oil bleed out under the same conditions over a period of 28 days. Examples 8 and 9 exhibited less than 10% oil bleed out over a period of 26 days under 120 kPa at 70° C. Example 9 exhibited less than 5% oil bleed out over a period of 26 days under 120 kPa at 70° C.

Although examples have been described herein, it should be appreciated that any subsequent arrangement designed to achieve the same or similar purpose may be substituted for the specific examples shown. This disclosure is intended to cover any and all subsequent adaptations or variations of various examples. Combinations of the above examples, and other examples not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single example for the purpose of streamlining the disclosure. This disclosure is not to be interpreted as reflecting an intention that the claimed examples require more features than are expressly recited in each claim. Rather, as the following claims reflect, inventive subject matter may be directed to less than all of the features of any of the disclosed examples. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other examples, which fall within the true spirit and scope of the description. Thus, to the maximum extent allowed by law, the scope is to be determined by the broadest permissible interpretation of the following claims and their equivalents, and shall not be restricted or limited by the foregoing detailed description

The invention claimed is:

1. A thermoplastic gel, prepared from a thermoplastic gel composition comprising
   50-80 wt % high molecular weight synthetic hydrocarbon softener oil;
   5-20 wt % styrenic triblock copolymer;
   3-12 wt % styrenic diblock copolymer; and
   0.2-1.5 wt % hindered phenol stabilizer, wherein the gel has a hardness between 15 Shore OOO and 65 Shore OOO.

2. The thermoplastic gel of claim 1, comprising:
   a base composition consisting of a thermoplastic rubber comprising the styrenic triblock copolymer and the styrenic diblock copolymer, and the high molecular weight softener oil; and
   the hindered phenol stabilizer and optionally at least one additive selected from the group consisting of a mineral filler, an anti-tack agent, a further stabilizer and mixtures thereof, wherein the base composition, hindered phenol stabilizer and the optional at least one additive define an overall composition, and wherein the gel has a hardness between 30 Shore OOO and 45 Shore OOO.

3. The gel of claim 1, wherein the gel exhibits less than 20 wt % oil bleed out after being under compression of 1.2 atm after at least 25 days at 70° C.

4. The gel of claim 2, wherein the at least one additive comprises a mineral filler, and wherein the mineral filler is between 0.1 wt % and 50 wt % of the overall composition.

5. The gel of claim 4, wherein the mineral filler is selected from the group consisting of talc, calcium carbonate, clay, wollastonite, silicates, glass, and combinations thereof.

6. The gel of claim 2, wherein the at least one additive comprises an anti-tack agent, and wherein the anti-tack agent is between 0.1 wt % and 10 wt % of the overall composition.

7. The gel of claim 6, wherein the anti-tack agent is selected from the group consisting of a silicone, silane, siloxane, or copolymer thereof.

8. The gel of claim 2, wherein the thermoplastic rubber comprises: (a) a base polymer having at least one functional group capable of crosslinking, (b) a functionalized extender, and (c) an optional crosslinker having multiple functional groups that are compatible and willing to react with the functional groups in the base polymer or the functionalized extender.

9. The gel of claim 1, wherein the high molecular weight oil is a poly-alpha olefin, linear-alpha olefin, or a combination thereof.

10. The gel of claim 2 further comprising an additional additive selected from the group consisting of a flame retardant, coloring agent, adhesion promoter, dispersant, flow improver, plasticizer, toughening agent, and combinations thereof.

11. The gel of claim 2, comprising the further stabilizer at between 0.1 wt % and 5 wt % of the overall composition.

12. A method of making the thermoplastic gel of claim 1, comprising:
   mixing a base composition consisting of a thermoplastic rubber comprising the styrenic triblock copolymer and the styrenic diblock copolymer, and the high molecular weight softener oil, with the hindered phenol stabilizer and optionally at least one additive selected from the group consisting of a mineral filler, an anti-tack agent, a further stabilizer and mixtures thereof, wherein the base composition, hindered phenol stabilizer and optional at least one additive define an overall composition, and
   providing heat to form the thermoplastic gel, wherein the resultant thermoplastic gel has a hardness between 15 Shore 000 and 65 Shore 000.

13. The method of claim 12, wherein the gel exhibits less than 20 wt %, oil bleed out after being under compression of 1.2 atm for at least 25 days at 70° C.

14. The method of claim 12, wherein the styrenic diblock copolymer is selected from the group consisting of a styrene-ethylene/butylene and a styrene-ethylene/propylene copolymer.

15. The method of claim 14, wherein the styrenic triblock copolymer is selected from the group consisting of a styrene-ethylene/butylene-styrene and a styrene-ethylene/propylene-styrene copolymer.

16. The method of claim 12, wherein the at least one additive comprises a mineral filler, and wherein the mineral filler is between 0.1 wt % and 50 wt % of the overall composition.

17. The method of claim 16, wherein the mineral filler is selected from the group consisting of talc, calcium carbonate, clay, wollastonite, silicates, glass, and combinations thereof.

18. The method of claim 12, wherein the at least one additive comprises an anti-tack agent, and wherein the anti-tack agent is between 0.1 wt % and 10 wt % of the overall composition.

19. The method of claim 18, wherein the anti-tack agent is selected from the group consisting of a silicone, silane, siloxane, or copolymer thereof.

20. The method of claim 13, wherein the high molecular weight softener oil has a molecular weight greater than 250 g/mol.

21. The method of claim 20, wherein the high molecular weight oil is a poly-alpha olefin, a linear-alpha olefin, or a combination thereof.

22. The thermoplastic gel of claim 1, wherein the high molecular weight synthetic hydrocarbon has a molecular weight greater than 250 g/mol.

23. The thermoplastic gel of claim 22, wherein the high molecular weight synthetic hydrocarbon has a molecular weight between 250 g/mol and 1500 g/mol.

24. The thermoplastic gel of claim 22, wherein the high molecular weight synthetic hydrocarbon oil is a hydrogenated synthetic hydrocarbon fluid.

25. The thermoplastic gel of claim 22, wherein the styrenic triblock copolymer is selected from the group consisting of styrene-ethylene/butylene-styrene and styrene-ethylene/propylene-styrene copolymer.

26. The thermoplastic gel of claim 22, wherein the gel exhibits less than 10% oil bleed out after being under compression of 1.2 atm for 26 days at 70° C.

27. The thermoplastic gel of claim 22, wherein the styrenic diblock copolymer is selected from the group consisting of styrene-ethylene/butylene and styrene-ethylene/propylene copolymer.

28. The thermoplastic gel of claim 9, wherein the high molecular weight synthetic hydrocarbon is a poly-alpha olefin or a linear alpha-olefin.

29. The thermoplastic gel of claim 26, wherein the gel exhibits
   a Shore OOO hardness in the range of from 32 to 44;
   a stress relaxation (60 s value) of from 13-28%;
   a tensile strength in a range of from 0.41 to 1 MPa; and
   an elongation to break (%) in a range from 1000-2300%.

30. The gel of claim 25, wherein the styrenic triblock and diblock copolymers are selected from the group consisting of a combination of styrene-ethylene/butylene-styrene and styrene-ethylene/butylene-styrene copolymers (SEBS/SEB) and a combination of styrene-ethylene/propylene-styrene and styrene-ethylene/propylene copolymers (SEPS/SEP).

\* \* \* \* \*